US011880005B1

(12) United States Patent
Olsson et al.

(10) Patent No.: US 11,880,005 B1
(45) Date of Patent: *Jan. 23, 2024

(54) SONDE DEVICES INCLUDING A SECTIONAL FERRITE CORE STRUCTURE

(71) Applicant: SeeScan, Inc., San Diego, CA (US)

(72) Inventors: Mark S. Olsson, La Jolla, CA (US); Justin W. Taylor, San Diego, CA (US); Ray Merewether, La Jolla, CA (US); Jan Soukup, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,857

(22) Filed: Nov. 10, 2021

Related U.S. Application Data

(63) Continuation of application No. 14/027,027, filed on Sep. 13, 2013, now Pat. No. 11,187,822.

(60) Provisional application No. 61/789,074, filed on Mar. 15, 2013, provisional application No. 61/701,565, filed on Sep. 14, 2012.

(51) Int. Cl.
| | |
|---|---|
| *G01V 3/08* | (2006.01) |
| *G01V 3/10* | (2006.01) |
| *G01V 3/165* | (2006.01) |
| *H01Q 1/04* | (2006.01) |
| *H01Q 1/36* | (2006.01) |
| *H01Q 7/06* | (2006.01) |

(52) U.S. Cl.
CPC .............. *G01V 3/083* (2013.01); *G01V 3/10* (2013.01); *G01V 3/165* (2013.01); *H01Q 1/04* (2013.01); *H01Q 1/36* (2013.01); *H01Q 7/06* (2013.01)

(58) Field of Classification Search
None
See application file for complete search history.

(56) References Cited

U.S. PATENT DOCUMENTS

| | | | |
|---|---|---|---|
| 2,601,249 | A | 6/1952 | Brenholdt |
| 2,820,959 | A | 1/1958 | Bell |
| 2,908,863 | A | 10/1959 | Neff |
| 3,718,930 | A | 2/1973 | McCullough et al. |
| 3,746,106 | A | 7/1973 | McCullough et al. |
| 4,674,579 | A | 6/1987 | Geller et al. |
| 5,337,002 | A | 8/1994 | Mercer |
| 5,530,357 | A | 6/1996 | Cosman et al. |

(Continued)

OTHER PUBLICATIONS

Nternational Searching Authority, "Written Opinion of the International Searching Authority" for PCT Patent Application No. PCT/US13/59814, dated Mar. 14, 2015, European Patent Office, Munich.

(Continued)

*Primary Examiner* — Patrick Assouad
*Assistant Examiner* — Haidong Zhang
(74) *Attorney, Agent, or Firm* — Steven C. Tietsworth, Esq.; Michael J. Pennington, Esq.

(57) ABSTRACT

Sonde devices for providing magnetic field signals for use with utility locators or other devices are disclosed. In one embodiment a sonde device includes a housing, a core comprising a plurality of core sections, and one or more support structures, which may include windings. Circuit and/or power supply elements may be disposed fully or partially within the core to control generation of predefined magnetic field frequencies and waveforms.

19 Claims, 25 Drawing Sheets

(56) References Cited

U.S. PATENT DOCUMENTS

| | | | |
|---|---|---|---|
| 6,002,253 | A | 12/1999 | Bornhofft et al. |
| 6,088,580 | A | 7/2000 | Powlousky |
| 6,260,634 | B1 | 7/2001 | Wentworth et al. |
| 6,380,743 | B1 | 4/2002 | Selvog |
| 6,644,421 | B1 | 11/2003 | Long |
| 7,733,086 | B2 | 6/2010 | Prammer et al. |
| 11,187,822 | B2 * | 11/2021 | Olsson .................... H01Q 7/06 |
| 2005/0189945 | A1 | 9/2005 | Reiderman |
| 2006/0006875 | A1 | 1/2006 | Olsson et al. |
| 2006/0132278 | A1 | 6/2006 | Reyal et al. |

OTHER PUBLICATIONS

Prototek, "Efficient and Powerful," Magazine Ad, Nov. 2011, p. 24, Cleaner Magazine, Three Lakes, WI.

\* cited by examiner

| Time | 0-400ms | 400-500ms | 500-900ms | 900-1000ms |
|---|---|---|---|---|
| Frequency | 512Hz | ------ | 32,768HZ | ------ |

*Example Multi-Sectional Core Embodiment*

*Example Core Sections (e.g., Ferrite, Steel, Etc.)*

*Another Example Multi-Sectional Core Embodiment*

*Another Example Multi-Sectional Core Embodiment*

*Example Multi-Sectional Core Embodiment
With Cylindrical Inner Support Structure*

Example Multi-Sectional Core Embodiment With Internal Battery and Circuit Board

Example Multi-Sectional Core Sonde Embodiment With Coil Windings Illustrated

SONDE DEVICES INCLUDING A SECTIONAL FERRITE CORE STRUCTURE

CROSS-REFERENCE TO RELATED APPLICATIONS

This application claims priority under 35 U.S.C. $ 119(e) to U.S. Provisional Patent Application Ser. No. 61/701,565, filed Sep. 14, 2012, entitled SONDE DEVICES INCLUDING A SECTIONAL FERRITE CORE STRUCTURE, and to U.S. Provisional Patent Application Ser. No. 61/789,074, filed Mar. 15, 2013, entitled SONDE DEVICES INCLUDING S SECTIONAL FERRITE CORE STRUCTURE. The content of each of these applications is incorporated by reference herein in its entirety for all purposes.

FIELD

This disclosure relates generally to sonde devices, as well as methods of making and using such devices. More particularly, but not exclusively, the disclosure is directed to sonde devices for high frequency use having multiple ferrite arc core section elements and circuitry to generate output magnetic field signals at one or more frequencies.

BACKGROUND

In a typical application, a sonde, which is a device for generating magnetic fields within a pipe, conduit, or other cavity, is positioned with the pipe to generate output magnetic fields. An associated magnetic field locator is used above-ground, typically at or near the ground surface, to locate the position of the sonde relative to the surface and/or determine the sonde's depth.

Conventional sonde devices often employ a core structure composed of metals such as steel or a cylindrical bar of ferrite. As such, these core structures, used with batteries, are not optimized at reducing eddy currents resulting in a loss of efficiency for the sonde device. Furthermore, conventional sonde devices may be configured to only operate at one frequency, thereby allowing for less than ideal detection under certain circumstances where multiple and/or variable frequency magnetic field signals would be useful.

Accordingly, there is a need in the art to address the above-described as well as other problems.

SUMMARY

The present disclosure relates generally to methods and systems of sonde devices capable of being inserted into pipes or other conduits and emitting magnetic field output signals at one or more frequencies for locating purposes. Embodiments of sonde devices as described in the present disclosure may be used with a buried object locator device enabled to sense the emitted frequency or frequencies from the sonde device to trace and/or map buried pipe, conduits, other utilities or cavities.

For example, in one aspect the disclosure relates to a sonde device as may be used in buried object locating systems. The sonde device may include, for example, a housing, which may be a structural and/or waterproof housing. The housing may include threaded or otherwise sealable caps or openings to load or unload batteries or other internal elements. The sonde device may further include a core. The core may include a magnetic section with a plurality of core section elements. The core may further include one or more support structures for positioning the core section elements. The core may include one or more windings. The one or more windings may be disposed about the core structure. The windings may include primary and secondary windings.

In another aspect, the disclosure relates to a sonde that may include a core structure including two or more ferrite arc core section elements configured to optimize the reduction of eddy currents. In some embodiments, other materials, besides ferrites, may be used to reduce eddy currents.

In another aspect, the disclosure relates to a system for locating buried objects wherein a sonde device may be used in conjunction with an associated locator device and may be capable of emitting output magnetic field signals at two or more frequencies. In some embodiments, the frequencies may be manually switched by a user. In other embodiments, an automatic frequency switching scheme may be used in conjunction with an enabled locator device. In some embodiments, the frequencies emitted may include 512 Hz and 32,768 Hz.

In another aspect, a color changing light which may be an RGB LED may be added to a sonde in keeping with the present disclosure. In such embodiments, the light color may correspond to a particular frequency, thus providing a visual indicator of frequency to a user. The color scheme may be arranged in a spectrum whereby the corresponding frequencies may be arranged from low to high or high to low. Some colors, flashing of lights or rotation of colors may also correspond to other data. For instance, a white light may indicate low battery.

In another aspect, a sonde device in keeping with the present disclosure may be configured to allow a central passage allowing the sonde device to be used with a push jetter, horizontal directional drilling rig, other boring tools, etc. that may require fluids, air, or other materials to be pumped to and or removed through such a central passage. In such embodiments, batteries, such as Lithium Polymer batteries, may be wrapped into curved sections to surround the central passage.

In another aspect, a sonde device in keeping with the present disclosure may be enabled to transmit data to an enabled locator device or other device. For instance, binary phase shift keying or other encoding schemes may be used to communicate orientation of the sonde from a horizontal or vertical axis and/or signal strength of the sonde. In some embodiments where the signal strength is known, an enabled locator device may be enabled to recognize and compensate for degradation of the magnetic field of the sonde device as its battery discharges. In another aspect a sonde device in keeping with the present disclosure may be enabled to regulate constant power to a sonde with a known current. The signal output by the sonde may be measured and such measurements may be used to further control the output. Pulse-width modulation or other similar technique may be utilized to regulate the power.

In yet another aspect, temperature compensated crystal oscillators (referred to hereafter as TCXO) or voltage controlled temperature compensated crystal oscillator (VCTCXO) may be used to provide a precise and stable time reference on the sonde to allow the phase to be tracked and/or allow synchronous detection techniques to be used Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1:
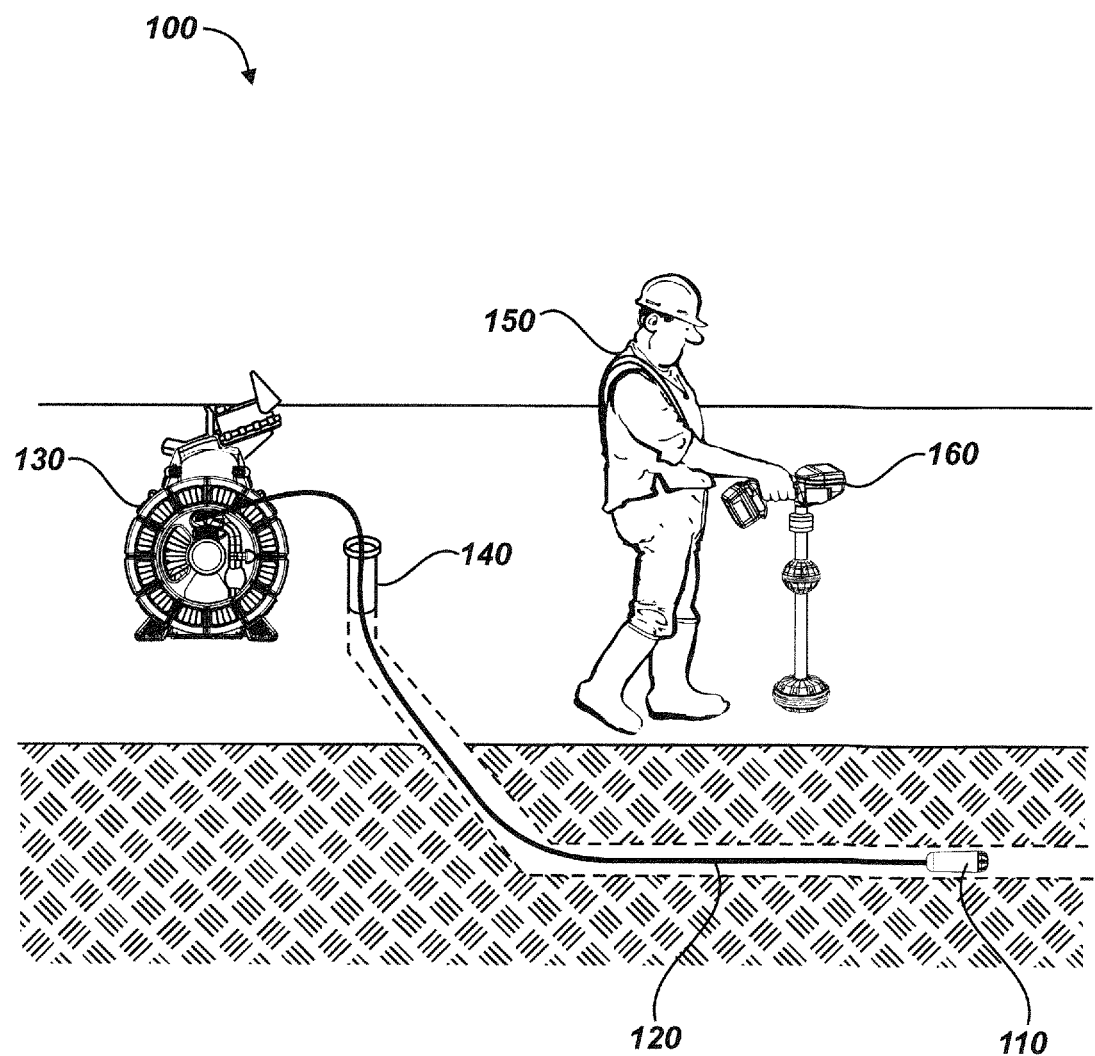
FIG. 1 illustrates an embodiment of a sonde device in use in a typical tracing/locating application.

This disclosure relates generally to sonde devices and methods of making and using such devices. More particularly, but not exclusively, the disclosure is directed to sonde devices for high frequency use having multiple ferrite arc core section elements and circuitry to generate magnetic fields at one or more frequencies. Embodiments of sonde devices as described in the present disclosure may be used with a locator device enabled to sense the emitted magnetic field output signals, at one or more frequencies, from the sonde device.

For example, in one aspect the disclosure relates to a core structure including two or more arc section elements for reducing eddy currents. The arc section elements may comprise a ferrite material. Other materials besides ferrites with eddy current reduction properties may also be used in various embodiments. Embodiments for low frequency operation may use other materials, such as soft steel.

In another aspect, the disclosure relates to a sonde device configured to emit output magnetic field signals at one or more frequencies, such as at the 512 Hz and 32,768 Hz frequencies. The frequencies may be either manually switched by a user or automatic switched using a timed switching circuit. In such an embodiment, a system may include a sonde and a locator device configured to detect the frequency switching.

In another aspect, the disclosure relates to a sonde device as may be used in buried object locating systems. The sonde device may include, for example, a housing, which may be a structural and/or waterproof housing. The housing may include threaded or otherwise sealable caps or openings to load or unload batteries or other internal elements. The sonde device may further include a core. The core may include a magnetic section with a plurality of core section elements. The core may further include one or more support structures for positioning the core section elements. The core may include one or more windings. The one or more windings may be disposed about the core structure. The windings may include primary and secondary windings.

The core section elements may be, for example, arc core section elements having at least one arc in the cross-sectional shape. The core section elements may comprise ferrite or other ferromagnetic materials or other magnetic metals such as Mu-metal, Nickel, etc. The core section elements may comprise steel, such as a soft magnetic steel. The core section elements may have a rectangular cross-sectional shape.

In some embodiments the plurality of core section elements may consist of two core section elements. In other embodiments the plurality of core section elements may consist of three core section elements. In other embodiments the plurality of core section elements may comprise four or more core section elements.

The core may further include, for example, a battery and a circuit element for providing current to the winding to generate an output magnetic field signal. The battery and the circuit element may be disposed partially or entirely within a volume enclosed by the plurality of core section elements. The circuit element may include circuitry for generating the current to provide the output magnetic field signals at two or more frequencies. The output signal may be switched between the two or more frequencies. One or more signal or power wires may be disposed in an axial gap between ones of the plurality of core section elements.

In some embodiments, the sonde may be configured to transmit data to an enabled locator device. For instance, data regarding the sonde's orientation from a horizontal or vertical axis and/or signal strength of the sonde.

Various additional aspects, features, and functions are described below in conjunction with FIGS. 1 through 23 of the appended Drawings.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

Example Sonde Device Embodiments

In a typical buried object locating/tracing operation, a sonde is positioned within a pipe, conduit, other utility or cavity and energized to generate magnetic field signals for detection by a buried object locator (also denoted herein as a "locator" for brevity) in what is commonly referred to as a "locate" or "tracing" operation. Turning to FIG. 1, an example tracing operation 100 in illustrated. As shown in FIG. 1, an embodiment of a sonde as described in the present disclosure, such as a sonde device 110 as shown, may be attached to a push-cable 120 on a cable reel 130 and inserted into a pipe 140 by a user 150. When activated, a magnetic field signal at least one frequency may be emitted from the sonde device 110 such that a user 150 may locate the position of the sonde device 110 with the use of locator 160.

Some example locators and sondes and associated configurations and functions are described in co-assigned patents and patent applications that may be used in conjunction with the sonde and locator system teachings herein include U.S. Pat. No. 7,009,399, entitled OMNIDIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009, and U.S. Provisional Patent Application Ser. No. 61/485,078, entitled LOCATOR ANTENNA CONFIGURATION, filed on May 11, 2011. Further information regarding systems, devices, and methods used with and otherwise relating to pipe sonde devices in keeping with the present disclosure may be found in U.S. Pat. No. 6,958,767, entitled VIDEO PIPE INSPECTION SYSTEM EMPLOYING NON_ROTATING CABLE STORAGE DRUM, issued Oct. 25, 2005, U.S. Pat. No. 7,221,136, entitled SONDES FOR LOCATING UNDERGROUND PIPES AND CONDUITS, issued May 22, 2007, U.S. Pat. No. 7,298,126, entitled SONDES FOR LOCATING UNDERGROUND PIPES AND CONDUITS, issued Nov. 20, 2007, and U.S. Pat. No. 7,863,885, entitled SONDES FOR LOCATING UNDERGROUND PIPES AND CONDUITS, issued Jan. 4, 2011. The content of each of these applications is incorporated by reference herein in its entirety (these applications may be collectively denoted herein as the "incorporated applications"). Various details of sonde operation may be implemented as described in this incorporated applications in conjunction with the disclosures herein. Signal processing, output display generation, data transmission and reception, and other electronic circuit functions may be implemented in one or more processing elements as described herein. Such processing elements may also implement sonde and/or locator functions as are described in the incorporated applications in various embodiments.

In some embodiments, the frequency emitted by the sonde may be selected by the user, such as the user 150, and/or automatically selected by the sonde and/or an attached control device or system or locator. In yet other embodiments, a switching process between multiple frequencies may be employed, which may provide increased resolution to an enabled locator device. For instance, the sonde device may emit one frequency over a known duration of time before switching to a different frequency for another duration of time prior to switching back to the original frequency. Examples of such frequency switching schemes are described subsequently herein in conjunction with FIG. 9.

Figure 2:
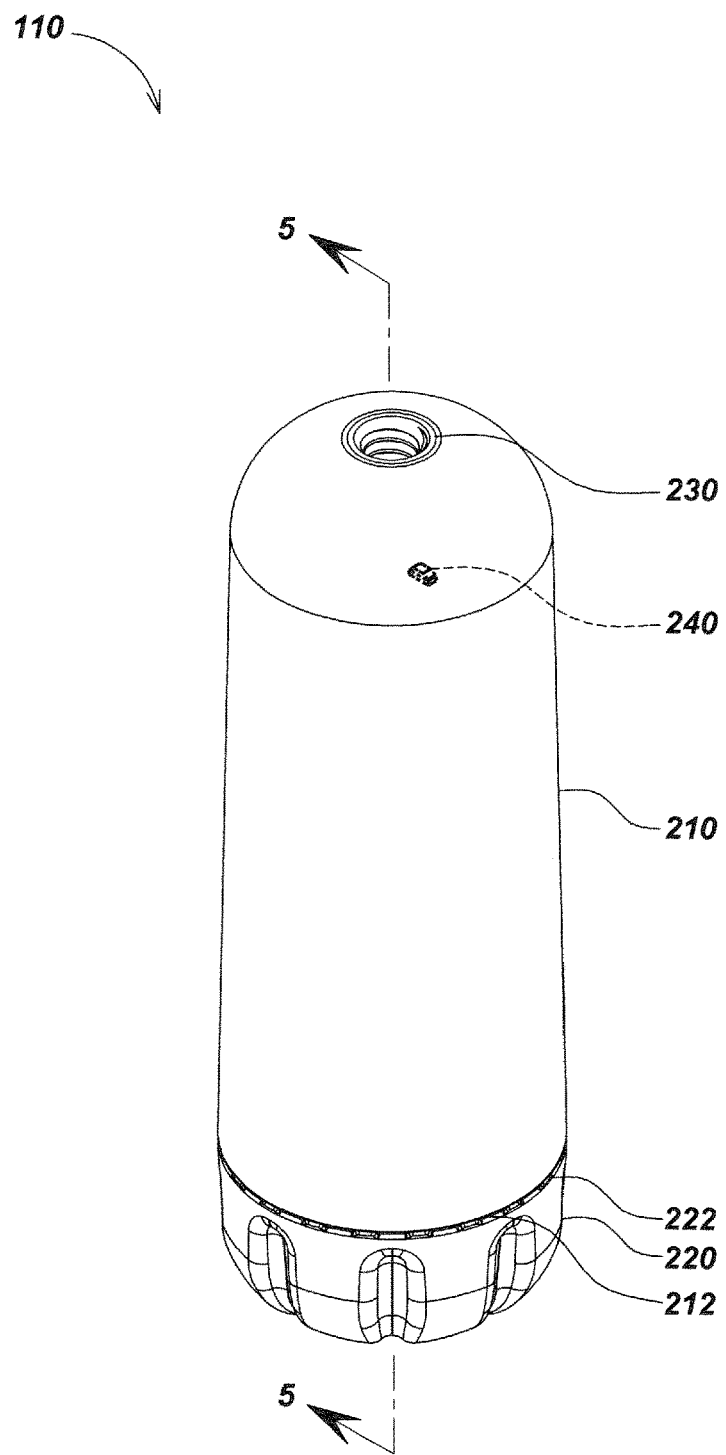
FIG. 2 is an isometric view of the sonde device embodiment of FIG. 1.

Turning to FIG. 2, details of an exemplary sonde device embodiment 110 are illustrated. The sonde device 110 may be largely cylindrical in shape and dimensioned to fit within a pipe such as the pipe 140 of FIG. 1. Externally, the sonde device 110 may include an outer protective case or housing, such as an outer shell piece 210, a battery compartment cap 220, and a threaded push-cable fitting 230. The battery compartment cap 220 may be secured about one end of the outer shell piece 210 in order to provide a water-tight seal to the internal components of the sonde device 110. Grooves/threads formed about the circumference of the battery compartment cap 220 may allow a user to remove the battery compartment cap 220 by hand and access a battery stored within, such as the battery 510 illustrated in FIG. 5A. A series of locking bumps 212 may be formed at the inner edge of the threads on the outer shell piece 210 that may mate with locking bumps 222 formed on the outer edge of the battery compartment cap 220. The mated locking bumps 212 and 222 may allow for additional effectiveness in securing the battery compartment cap 220 to the outer shell piece 210 in assembly. The outer shell piece 210 and/or the battery compartment cap 220 may be composed of transparent material allowing light from an LED 240 to be visible to a user that may, for instance, be used to indicate the device has been activated. In some embodiments, the LED 240 may be a RGB LED capable of illuminating in different colors. In such embodiments, a scheme may be used whereby different colors may be used to indicate different frequencies. For instance, low frequencies may be indicated by a red light where higher frequencies may be indicated by, for instance, a blue or purple light. The spectrum of colors between the red light indicating a low frequency and the purple light indicating a high frequency may be reserved for frequencies in between the two. In such embodiments employing such an RGB LED, some colors may be reserved for indicating other information. For instance, a white light may indicate a low battery to the user. In some embodiments, colored labels may also be placed onto or inside the transparent enclosure 210 to indicate frequency. Enclosure 210 may similarly be colored opaque or translucent to indicate frequency. The spectrum of rainbow colors may be utilized from red to blue and then purple to indicate low to high frequencies. Multi-frequency sondes may use dual coloring to indicate the frequencies being used.

In the sonde device embodiment 110, a standard AA battery may be used to power the device. In some embodiments, other battery types may also be used including standard sized as well as custom batteries. In other embodiments, a cable reel and a push-cable may be used to provide power to the sonde device through wires disposed adjacent to, on, or within the push-cable. The push-cable fitting 230 of the sonde device 110 may be made to extend through the end of the outer shell piece 210 opposite that of the battery compartment cap 220.

Figure 3:
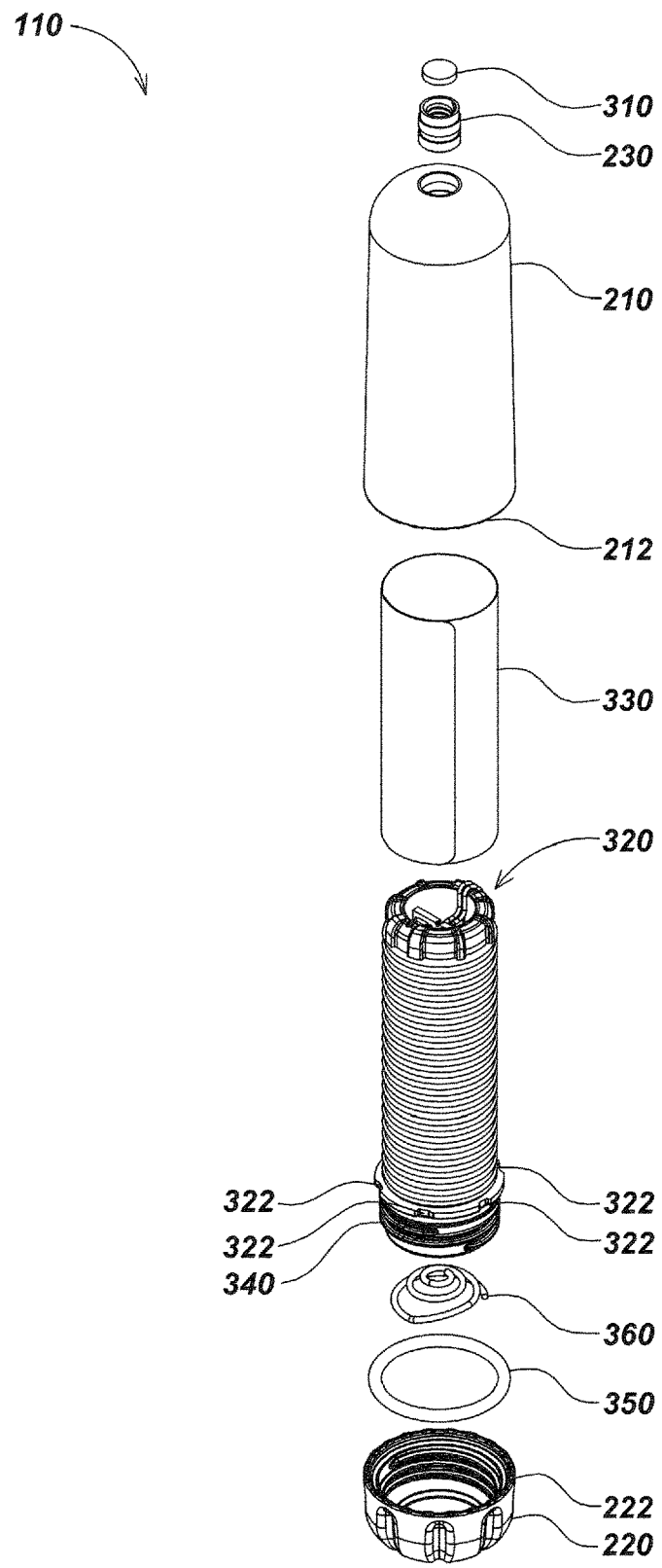
FIG. 3 is a top down exploded isometric view of the sonde device embodiment of FIGS. 1-2.
Figure 4:
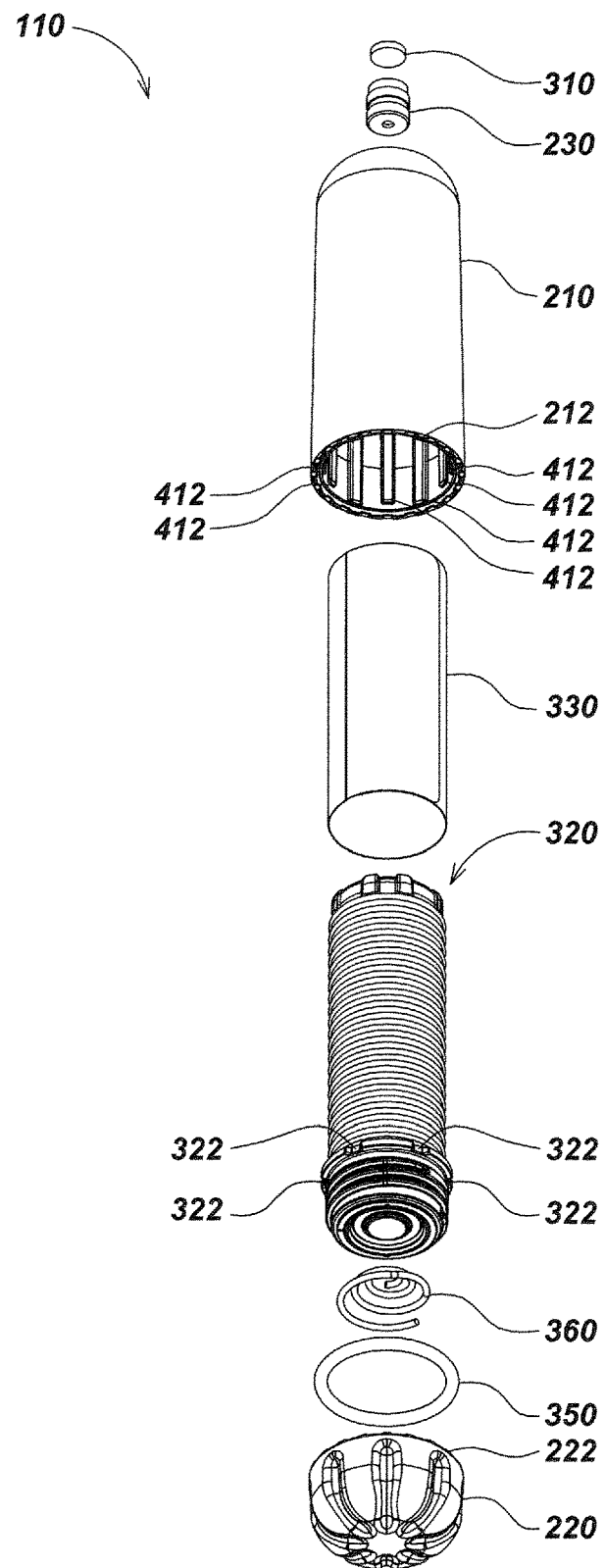
FIG. 4 is a bottom up exploded isometric view of a sonde device embodiment of FIGS. 1-3.

A push-cable, such as the push-cable 120 of FIG. 1, may be configured to mate with the threads of the push-cable fitting 230, thus securing the sonde device 110 to the push-cable. In manufacture, potting compound may be applied within and around the push-cable fitting 230, thereby securing the push-cable fitting 230 to the outer shell piece 210 and a core assembly 320 as illustrated in FIG. 3, and further providing a water tight seal. The push-cable fitting 230 may also be insert molded into shell 210. Push-cable fitting 230 may also be thermally or ultrasonically inserted and fused with shell 210.

Turning to FIGS. 3-5A, a potting plug 310 may be dimensioned to fit snugly within the push-cable fitting 230 and be used to restrict backflow of potting compound during the manufacturing process. Internal to the outer protective structure, the sonde may include a core assembly including core elements, wiring to form a coil, and core/coil structural supports which may be made of non-conductive materials such as fiberglass, plastics, as well as other materials such as carbon fiber, etc.

In the embodiment shown, a core assembly 320 may be largely cylindrical in shape and dimensioned to fit within the outer shell piece 210. A core assembly keying feature 322 may be made to mate with a shell keying features 412 (FIG. 4) located along the inner walls of the outer shell piece 210 to prevent unwanted rotations of the core assembly 320. Optionally, a product label 330 may be adhered about the core assembly 320 and used to convey pertinent information regarding the sonde device 110 to a user, such as in embodiments where the outer structure is transparent or includes a transparent window.

The core assembly 320 may include a threaded core sleeve 340 which may mate with threads formed along the inside of the battery compartment cap 220. In assembly, a core sleeve O-ring 350 may be seated between the threaded core sleeve 340 and the battery compartment cap 220 to provide a water-tight seal.

Figure 5A:
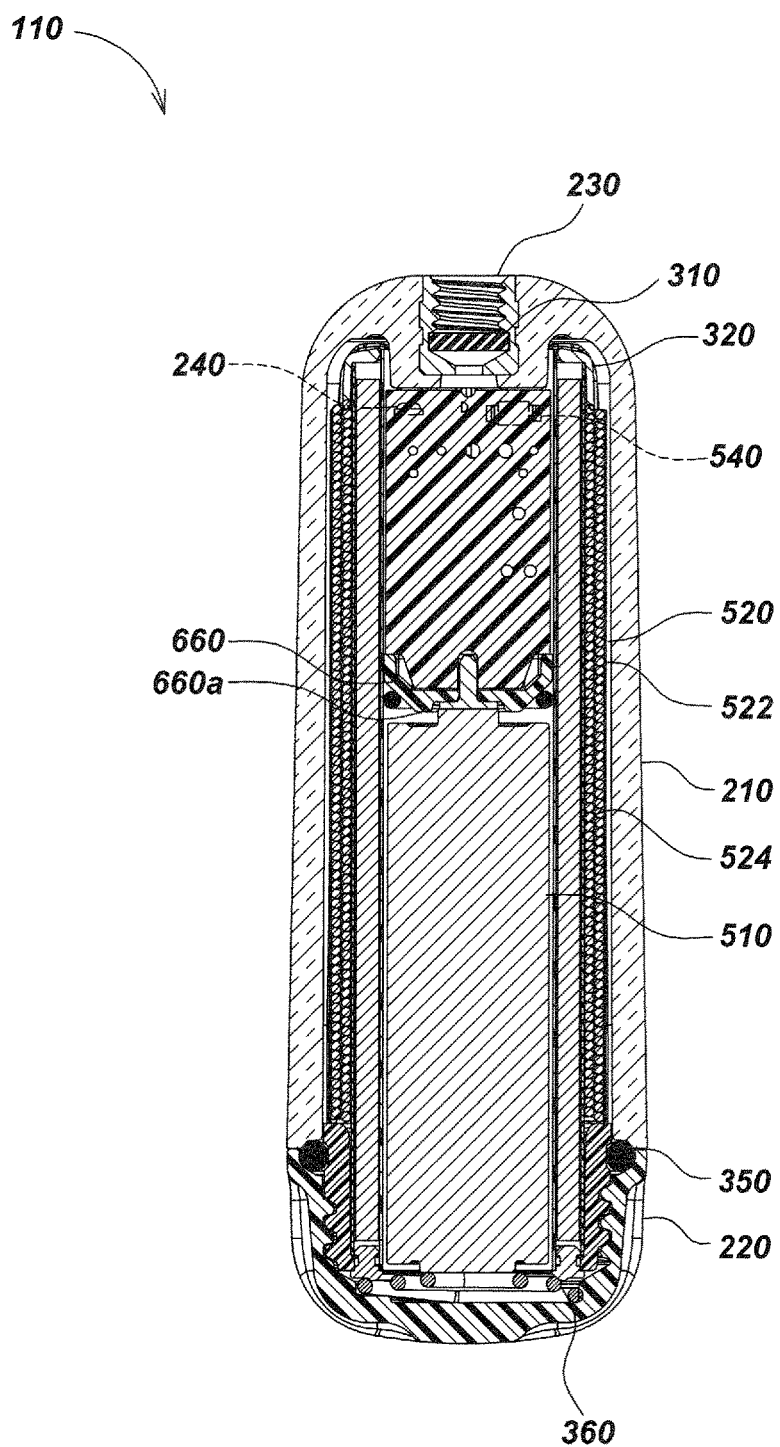
FIG. 5A is a sectional view of the sonde device embodiment of FIG. 2, along line 5-5.

A battery contact spring 360 may be seated within the battery compartment cap 220. In use, the battery contact spring 360 may be assembled such that the current path from a battery to internal electronics is only closed in the last quarter to half revolution so as to provide a way to activate and deactivate the sonde device 110. In other embodiments, a magnetic switch may be used to activate and/or deactivate a sonde device such as the sonde device 110. As illustrated in FIG. 5A, the hall-effect sensor 540 may be enabled to operate as a magnetic switch. In other embodiments, sonde devices in accordance with the present disclosure may use a variety of other switching technologies including, but not limited to, controls placed on a cable reel, wireless communications between an enabled locator device and sonde device, as well as the use of a variety of other mechanical and electronic switching mechanisms. Such mechanisms may be wired or wireless.

Turning to FIG. 5A, a coil sub-assembly 520 may be formed along the length of the core assembly 320, which may include one or more coils using a series of windings of ferromagnetic wiring such as, for example, litz wiring. With multiple coils, the coils may be configured as a step-up transformer. For example, the coils may include a series of primary antenna coils 522 and secondary antenna coils 524.

In operation, the combination of a primary antenna coil, such as the primary antenna coils 522, and secondary antenna coils, such as the secondary antenna coils 524, may act as a step-up transformer producing high voltage and high current in the secondary antenna coil dependent on the number of windings and wire diameter and kinds employed. Higher currents in the secondary winding create stronger magnetic fields for detection by the associated locator. In alternate embodiments, different numbers of windings and materials and diameters for coils may be used. For instance, a sonde device as described in the present disclosure may include a single antenna coil rather than utilizing primary and secondary coils.

In accordance with one aspect, a core assembly of a sonde may include multiple core section elements, which may comprise ferrite or other high-frequency materials for sondes operating at higher frequencies. For sondes operating at lower frequencies, multiple core section elements of a similar configuration to that described herein may be made of soft steel or other ferromagnetic materials. In various embodiments, use of multiple core section elements may aid in reducing eddy currents and/or provide other advantages. In an exemplary embodiment, the core section elements may include an arc-shaped cross section, with the arc formed to conform to the shape of the sonde, such as an arc section of a circular cross-section sonde.

Figure 5B:
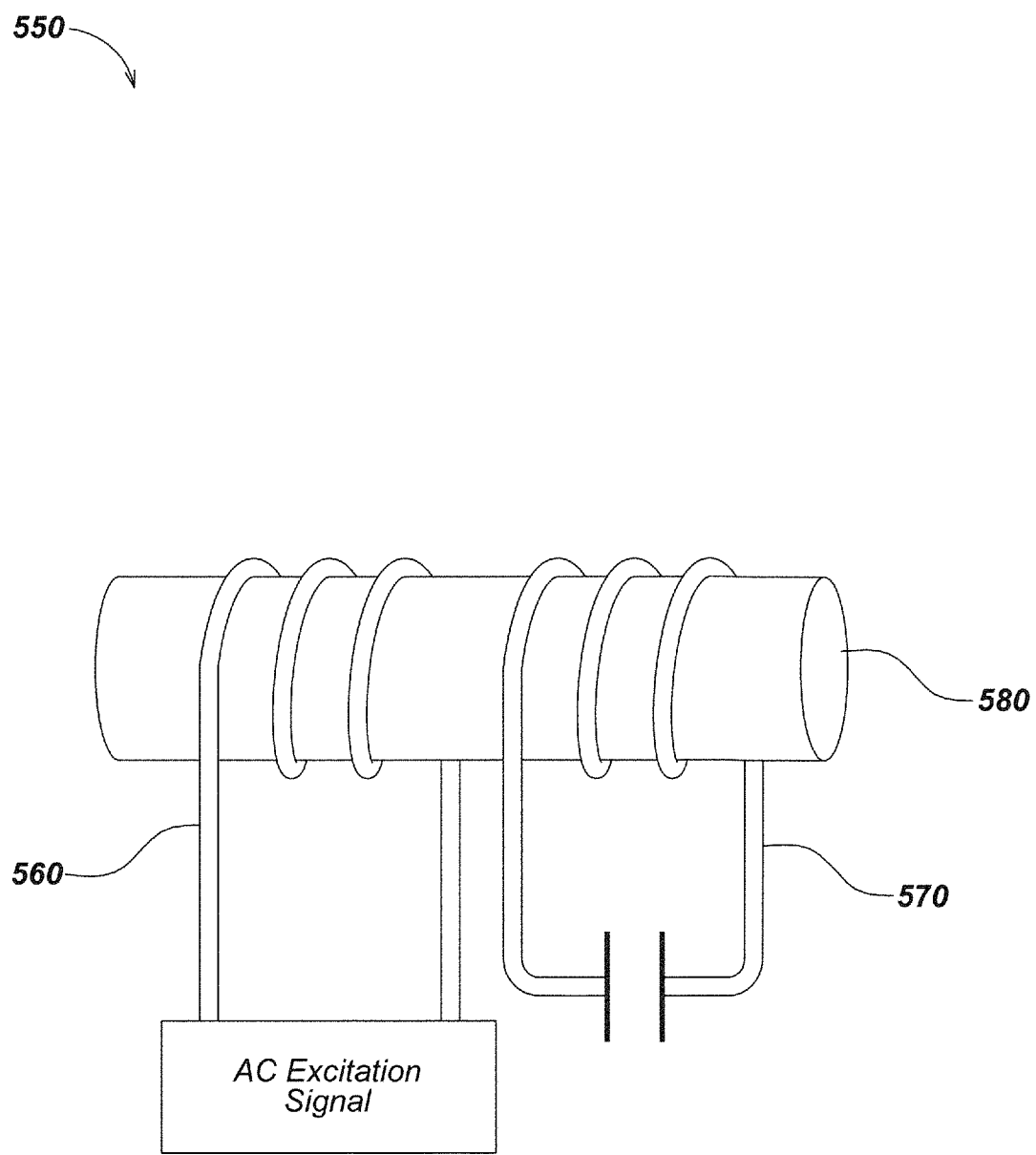
FIG. 5B is an illustration of an embodiment of an LC circuit.

In some embodiments, a resonant or LC circuit, such as the LC circuit 550 of FIG. 5B may be used to generate desired or selected frequencies. In such embodiments, a primary coil 560 and a secondary coil 570 may be wound about a ferrite core 580. The ferrite core 580 may be composed of one or more sectional ferrite piece in keeping with the present disclosure. The ferrite core 580 may act as a magnetic shield to reduce magnetic field intensity inside the ferrite core 580. Components housed by the ferrite core 580 may not cause undue magnetic losses and may allow for the creation of a higher frequency sonde with a degree of Q to increase the output power, range, and conserve battery power.

Figure 6:
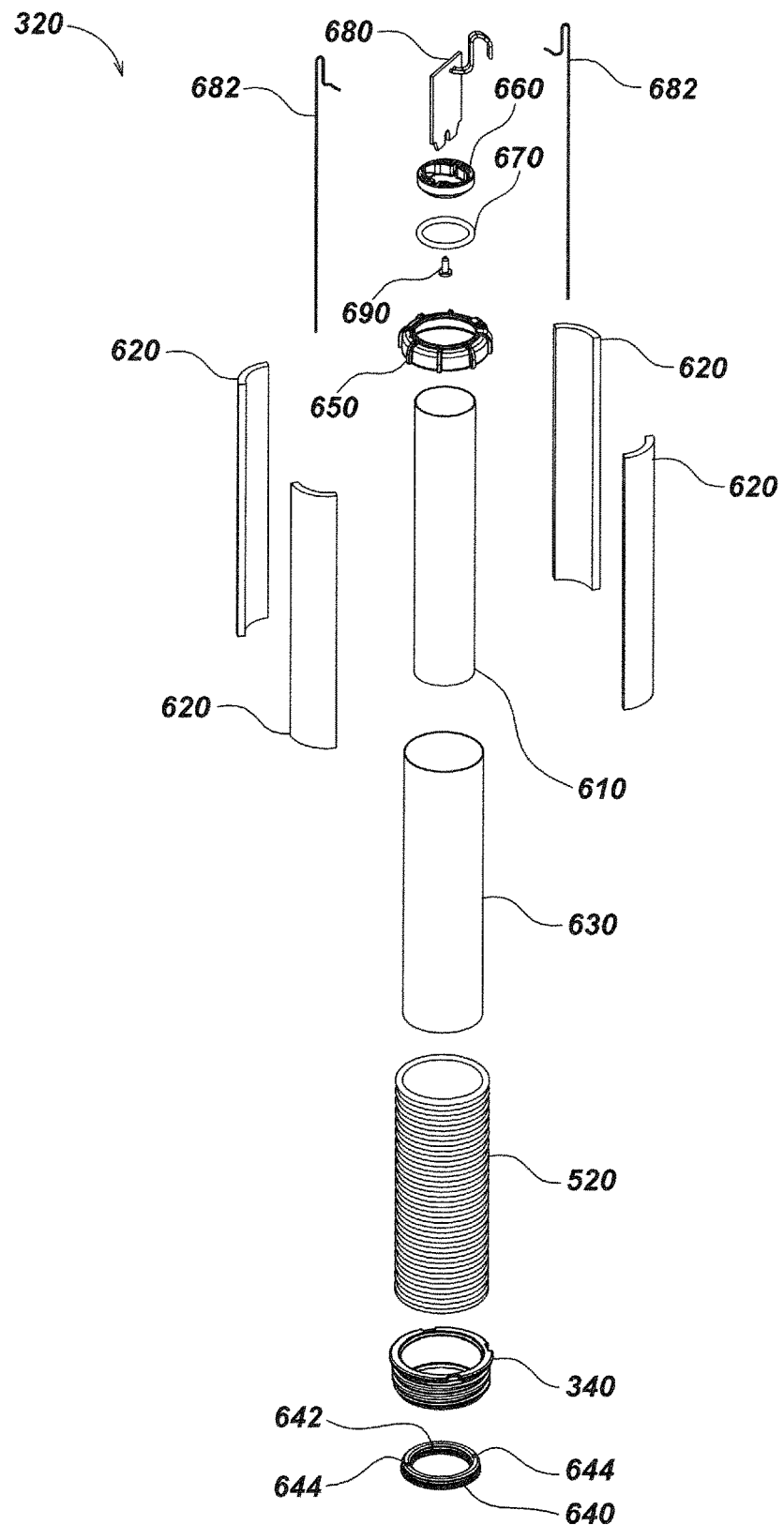
FIG. 6 is a top down exploded isometric view of an embodiment of a core assembly.
Figure 7:
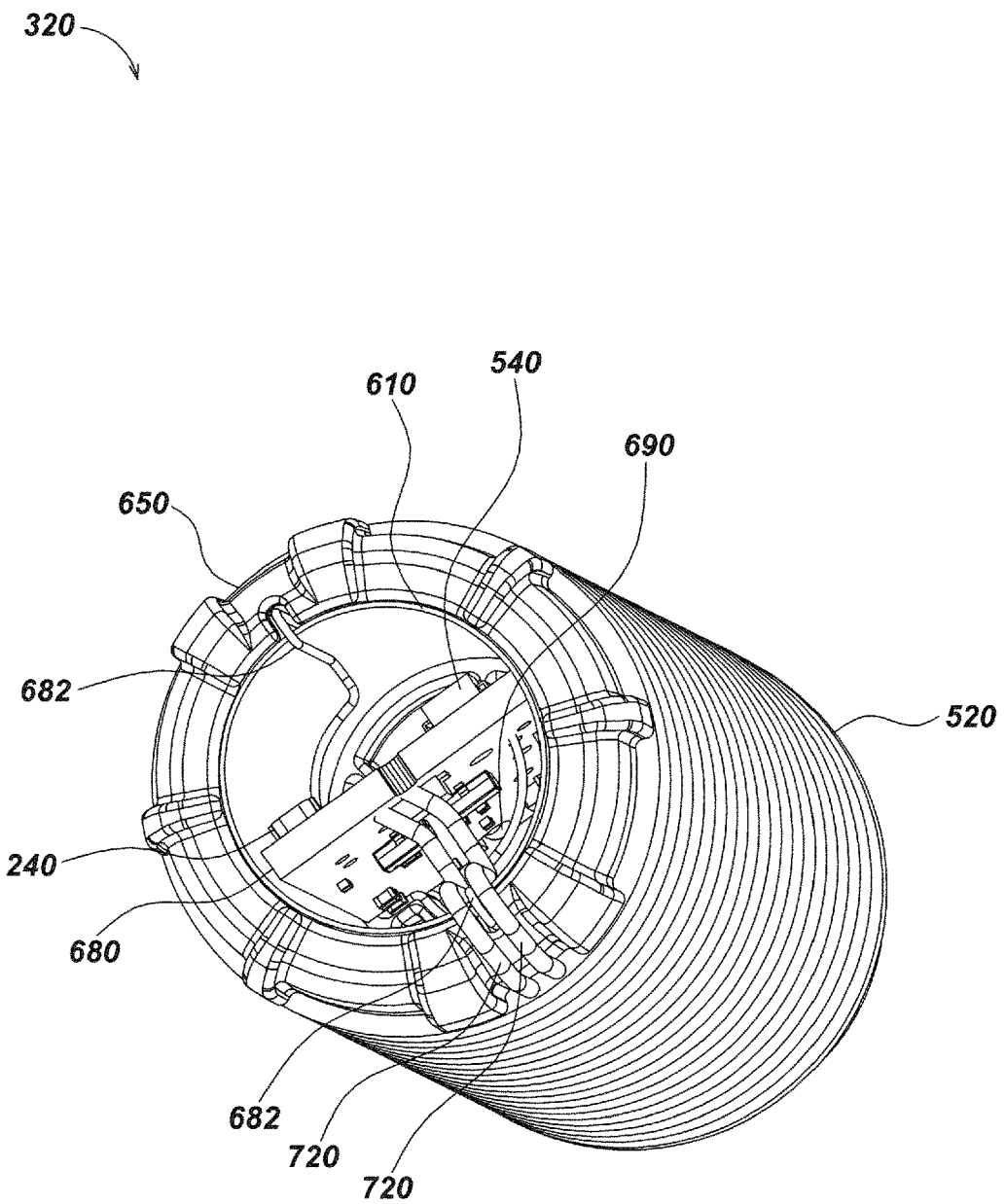
FIG. 7 is an isometric view of the core assembly embodiment revealing a PCB.
Figure 8:
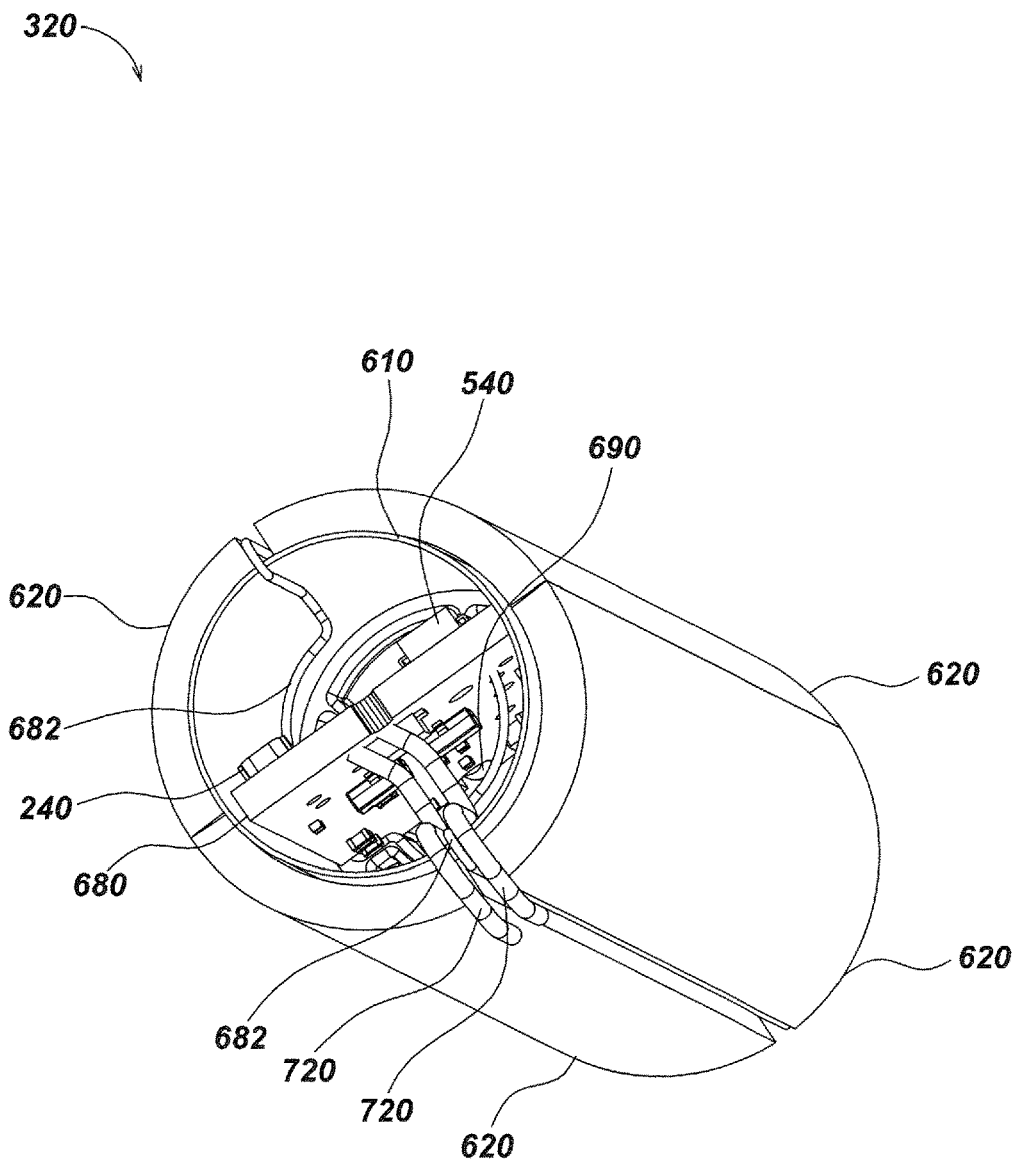
FIG. 8 illustrates the core assembly embodiment of FIG. 7 with coil windings and outer core tube removed to reveal the ferrite arc sections.

Turning to FIGS. 6-8, the core assembly embodiment 320 may include an inner core tube 610 around which a plurality of ferrite arc core section elements 620 may be secured by an outer core tube 630. In the exemplary core assembly 320 there are four ferrite arc section elements 620 used, however, in alternative embodiments, the ferrite arc section elements may instead be constructed of materials with similar properties of high magnetic permeability and low electrical conductivity to aid in preventing eddy currents from forming and/or may have different numbers of section elements. Examples of alternate embodiments are described subsequently herein, such as embodiments having two or three section elements. Other embodiments (not shown) may include more than four section elements.

The arc core section elements may be surrounded, either internally, externally, or on both sides by structural support elements, such as core tubes. For example, an outer core tube 630 may include non-conductive materials such as fiberglass resin or other non-conductive materials to prevent eddy currents from forming. The arc core section elements may be enclosed by and/or bonded to inner and/or outer core tubes to aid in positioning. Gaps between the arc core sections may be used to run power and/or signal wiring through the sonde. For instance, return wires 682 may be secured within the gaps between the arc core sections.

The windings of the coil sub-assembly 520 may be seated along the external surface of the outer core tube 630. The threaded core sleeve 340 may be seated about the end of the core assembly 320 nearest the compartment containing the battery 510 as illustrated in FIG. 5A. A core insert ring 640, which may be disposed below the threaded core sleeve 340, and a top core retainer 650, which may be disposed about the opposite end thereto, may function to secure the core assembly 320 together. The core insert ring 640 may also include a core ring slit 642 disallowing eddy currents to form in the core insert ring 640 preventing a shorted turn. A set of wiring holes 644 may also be formed through the core insert ring 640 allowing wiring to pass through. Within the inner core tube 630, a printed circuit board (PCB) holder piece 660 and PCB O-ring 670 may be seated above the compartment containing the battery 510 (FIG. 5A) such that a watertight seal may be formed to protect a PCB 680 secured to the PCB holder piece 660. A printed circuit pin 690 may be made to pass through PCB holder piece 660 and electrically connect a battery, such as the battery 510 of FIG. 5A, to the PCB 680. The PCB holder piece 660 may be formed with a connection limiting feature 660a that may prevent a battery from make an electrical connection when the battery has been installed backwards.

As shown in FIGS. 7 and 8, a set of return wires 682 may provide an electrical connection between the PCB 680 and the battery contact spring 30 (FIG. 3). In use, the battery contact spring 360 and return wires 682 may be assembled such that the two components make contact, thus closing the current path from the battery 510 of FIG. 5A to the PCB 680, in the last quarter to half revolution of the battery compartment cap 220 with attached battery contact spring 360. In assembly, the battery contact spring 360 may avoid contacting the core insert slit 642 of the core insert ring 640 (FIG. 6) to close the circuit so as to allow eddy currents to form. A set of coil leads 720 may provide an electrical connection between the PCB 680 and the primary antenna coils 522 and secondary antenna coils 524 (FIG. 5A). As best illustrated in FIG. 8, the gaps or openings between the ferrite arc core section elements 620 may provide for an ideal passageway for the return wires 682 and the coil leads 720 from the PCB 680 to be routed to their respective component destinations.

Figure 9:
FIG. 9 illustrates an embodiment of a frequency switching process for use in a multi-frequency sonde device.

Turning to FIG. 9, a frequency switching scheme, such as the switching process embodiment 900 as shown, may include providing output magnetic field signals from the sonde at two or more frequencies. The frequency switching process 900 illustrates a scheme whereby two frequencies, 512 Hz and 32,768 Hz, may be switched between in a timed interval, repeating on a one second interval. Periods in which no transmission occurs may also exist between switching of frequencies to prevent ringing of digital filters on an enabled locator device such as the locator device 160 of FIG. 1. Other frequency, phase, and/or time-varied schema may be used in various embodiments. Different frequencies used in the switching scheme may be generated by tuning and/or filtering harmonics of a base frequency to obtain the higher frequency signals, by directly generating the desired frequencies, or by other signal generation techniques as are known or developed in the art. The output of both frequencies may remain phase locked to a common clock. The higher frequency may be an integer multiple of the lower frequency. The frequencies may both be powers of two.

An enabled locator device may also synchronize its time with a sonde device in order to ensure the locator device is only accounting for sensed signals when the transmitted frequency is at an interval of full amplitude and/or to avoid ringing of digital filters on the locator device or other signal processing constraints. Examples of time synchronization methods may include time synchronization using GPS receivers at both the locator and inducer, or other systems generating timing signals, ISM, cellular, or other radio communications to receive timing information and/or coordinate timing between locators and inducers, using known (at the locator) pre-defined switching patterns, and/or any other mechanism known or developed in the art for sharing such information.

Further example ways of synchronizing time of a locator device and another associated device are described in co-assigned U.S. Provisional Patent Application Ser. No. 61/561,809 entitled MULTI-FREQUENCY LOCATING SYSTEMS AND METHODS filed Nov. 18, 2011, the content of which is incorporated by reference herein. In some embodiments, the sonde device may have a dial or similar mechanism allowing the user to manually select the desired frequency to transmit. In some embodiments, the frequency transmitted by the sonde device may be selected remotely by an enabled locator device or via the cable-drum. It may be further noted that a different number of frequencies may also be utilized. In some embodiments, a locator device may also be configured to recognize a pre-defined pattern of transmitted frequencies. In such embodiments, the locator device may recognize the pattern of frequencies transmitted and synchronize to the pattern accordingly.

Example Sonde Core Embodiments

As is known in the art, fabrication of ferrite core elements can be difficult, especially if elements of long axial length are desired (e.g., long cylindrical tubular structures). At the same time, for sonde applications it is frequently advantageous to have a long cylindrical core, and materials such as ferrite are highly preferable for high frequency device operation.

Ferrite core element manufacturing typically includes extrusion of a ferrite paste material through an extruder die at pressure. For cylindrical or other hollow-shaped extrusions, positioning of the extruded material on a similar cylindrical form is typically required in order to maintain shape. However, for larger-sized and/or longer extrusions, the extruded paste may slip or slide on the form, thereby distorting the shape and/or creating cracks, gaps, or other defects. Consequently, forming precisely shaped cylindrical ferrite cores is difficult and typically expensive.

Once the extrusion has been formed, it is then typically fired or otherwise cured to form a hard but brittle structure. Supporting a hollow tubular thin walled ferrite structure during firing or sintering is also difficult and problematic.

Hard brittle cylindrical ferrite structures, when disposed in a sonde or other device, are subject to damage such as cracking from being dropped, from being pressed into contact with pipe interiors, being pressed by other sonde interior elements or structures, or from other actions. Cracked ferrite core elements can strongly affect the magnetic field signals generated by the sonde, thereby weakening and/or distorting the output magnetic fields.

Accordingly, in one aspect, a core structure including multiple "arc section elements," such as core arc section elements 620 as shown previously in FIG. 6, may be manufactured and used in a sonde device rather than using a single cylindrical tubular ferrite core structure (not shown). These arc section elements may advantageously be easier to manufacture, may be lower in cost, may provide enhanced performance, such as by reducing device performance upon cracking of only one of multiple arc section elements (as opposed to cracking of the entire core when a single tubular core is used), and may provide other advantages, such as by providing routing paths for power and or signal wiring or for other components or structures.

Figure 10A:
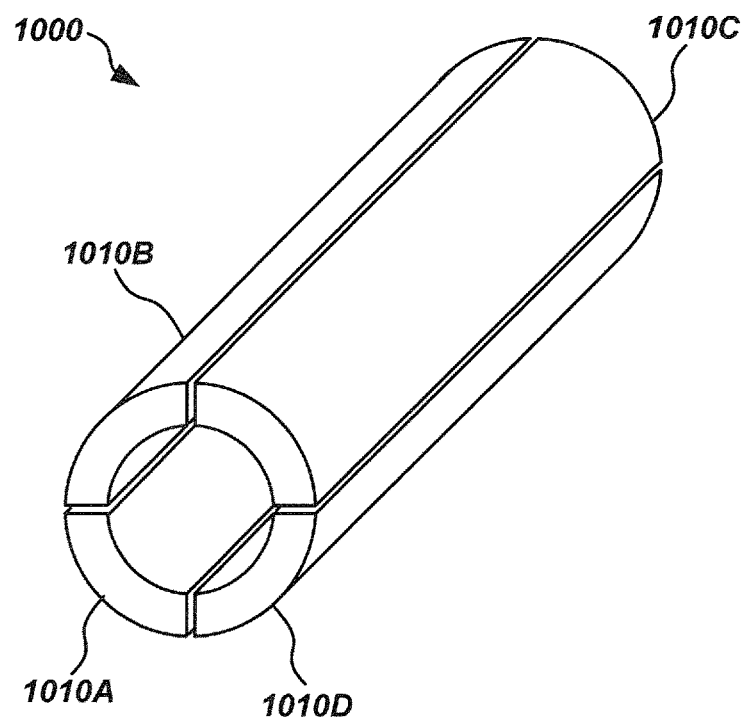
FIGS. 10A & 10B illustrates details of an embodiment of a sonde device core including four arc core section elements.

FIG. 10A illustrates one example embodiment of an arc section core 1000 with four ferrite arc core section elements, elements 1010A, 1010B, 1010C, and 1010D. These elements are denoted "arc" core section elements since at least a portion of the interior side of the elements may be formed with a curved or arc shape to substantially match a cylindrical support form's outer surface. Each of these core section elements may be separately manufactured, such as by extrusion, molding, or other ferrite/ceramic manufacturing techniques as known or developed in the art.

In an exemplary embodiment, an extrusion die having a shape corresponding to the desired arc section core element cross-section may be used for extruding paste material onto a form, thereby allowing better support of the material before firing. Since the arc sections need not be hollow in the middle, advantages in forming and manufacturing may be achieved over hollow-centered cylindrical tubular extrusions.

Figure 10B:
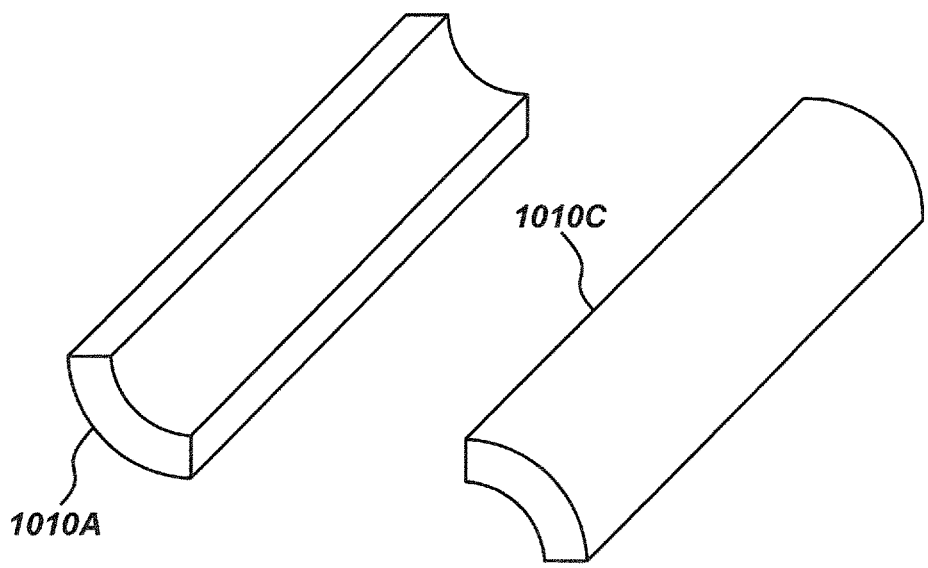

FIG. 10B illustrates example arc core section elements 1010A and 1010C from core 1000 of FIG. 10A. Each of these section elements may be separately manufactured and then positioned around a support structure, such as through frictional contact, adhesives, etc. Since there are separate core section elements, they may be more resistant to impact or twisting breakage (as compared to a single tubular ferrite core) in sondes using this type of core structure. Further, manufacturing tolerances may be lower since the core section elements may be positioned with varying gaps between each other, particularly if they are mounted on a support structure of slightly larger diameter than the inside diameters of the arc core section elements when placed in direct contact. Another potential advantage may result in the event of impacts or twisting, in which case even if one of the arc core section elements breaks, others may not. This may allow for continued better performance of a sonde using multiple arc core section elements as compared to a sonde using a single hollow tubular core (where the entire core is likely to break upon impact). There may be other potential advantages in manufacturing, sonde configuration, and operation. For example, as described previously herein, wiring or structures may be disposed in the gaps between arc core section elements to allow for reductions in size and/or other performance benefits.

Figure 11:
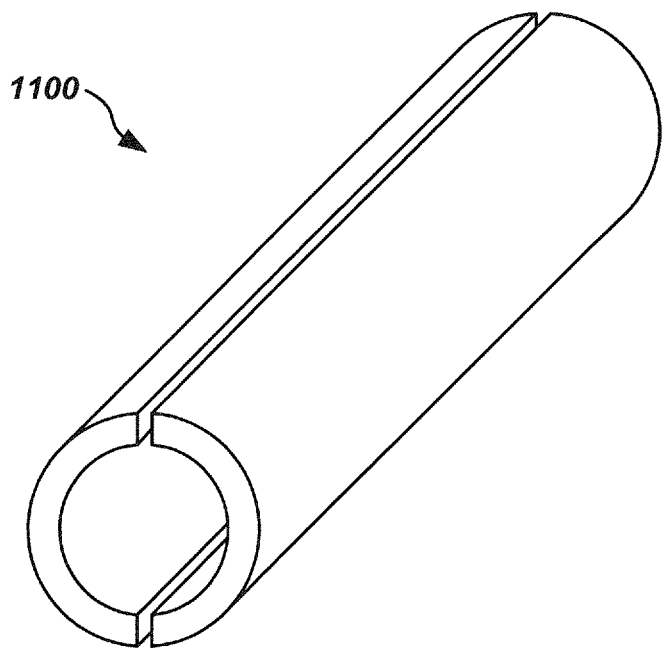
FIG. 11 illustrates details an embodiment of a sonde device core with two arc core section elements.
Figure 12:
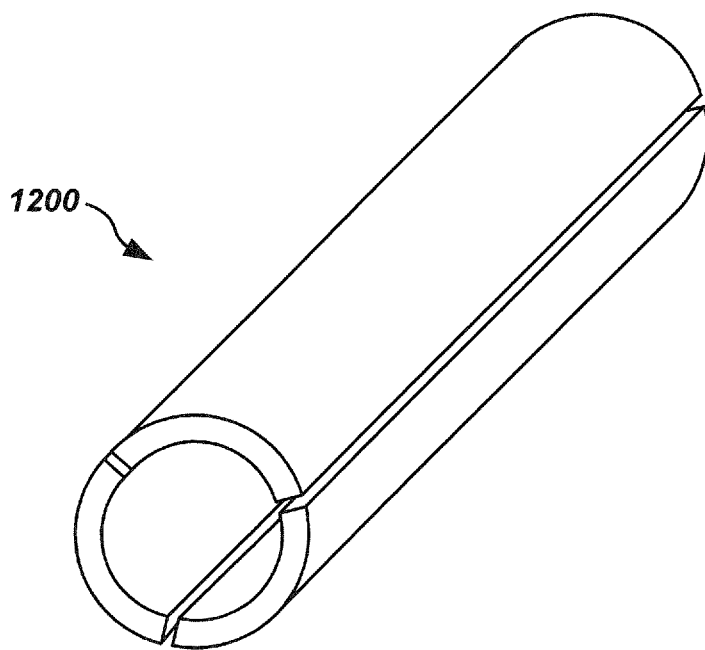
FIG. 12 illustrates details of an embodiment of a sonde device core with three arc core section elements.

In various embodiments, different numbers of arc core section elements may be used. For example, FIG. 11 illustrates an embodiment of a core section 1100 having two arc core section elements, while FIG. 12 illustrates an alternate embodiment having three arc core section elements. Other embodiments (not shown) may have more arc core section elements. Some embodiments may use elements having other cross-sectional shapes. For example, if a larger number of elements are used in the core, each element may have a rectangular cross-section (i.e., be formed as long rectangular cross-section ferrite bars, or be formed initially as bars and then slightly bent or curved to allow for placement around a circular cross-sectioned support structure) rather than having an arc-shaped interior surface.

Figure 13:
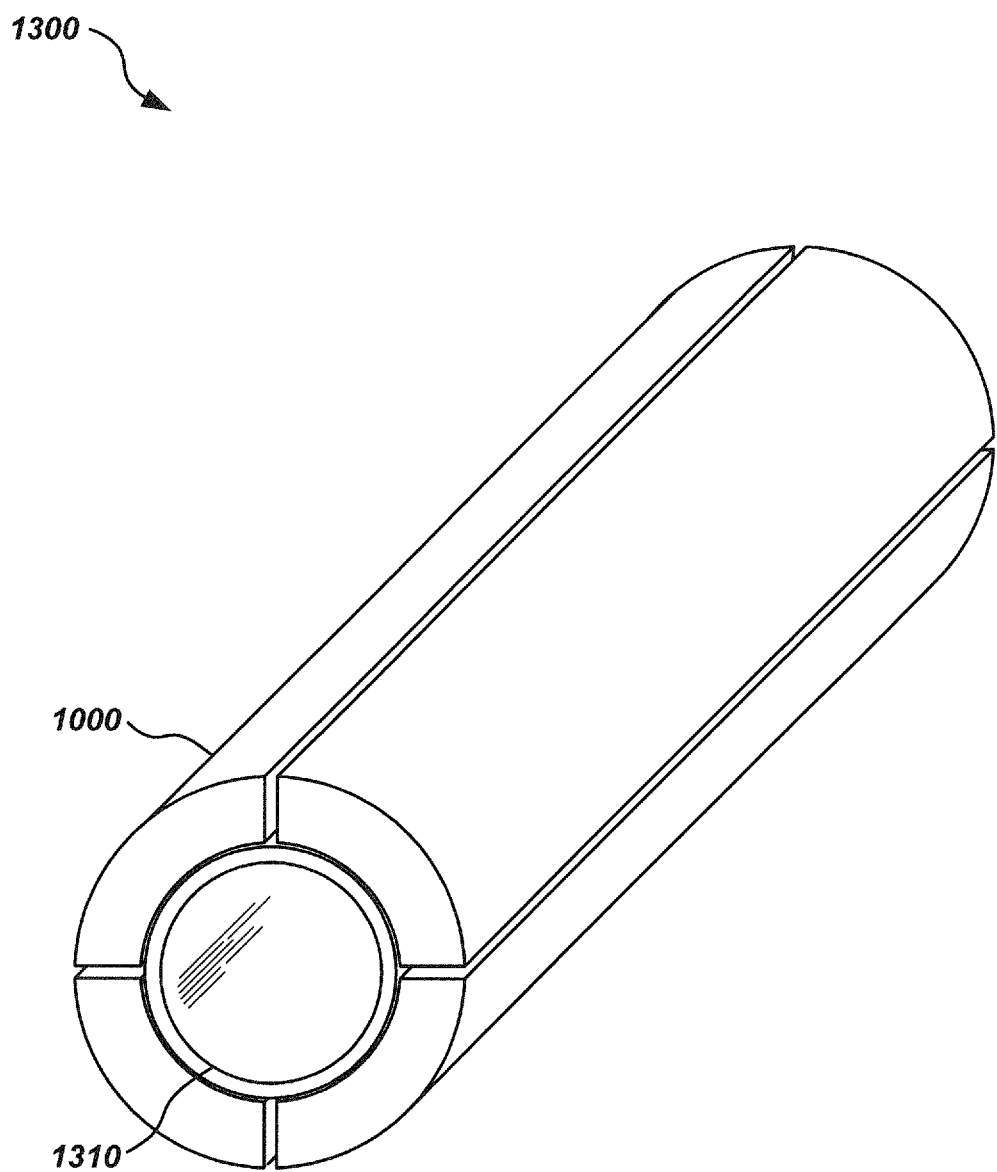
FIG. 13 illustrates details of an embodiment of a sonde device core with four arc core section elements and an internal structural support element for the core section elements.
Figure 14:
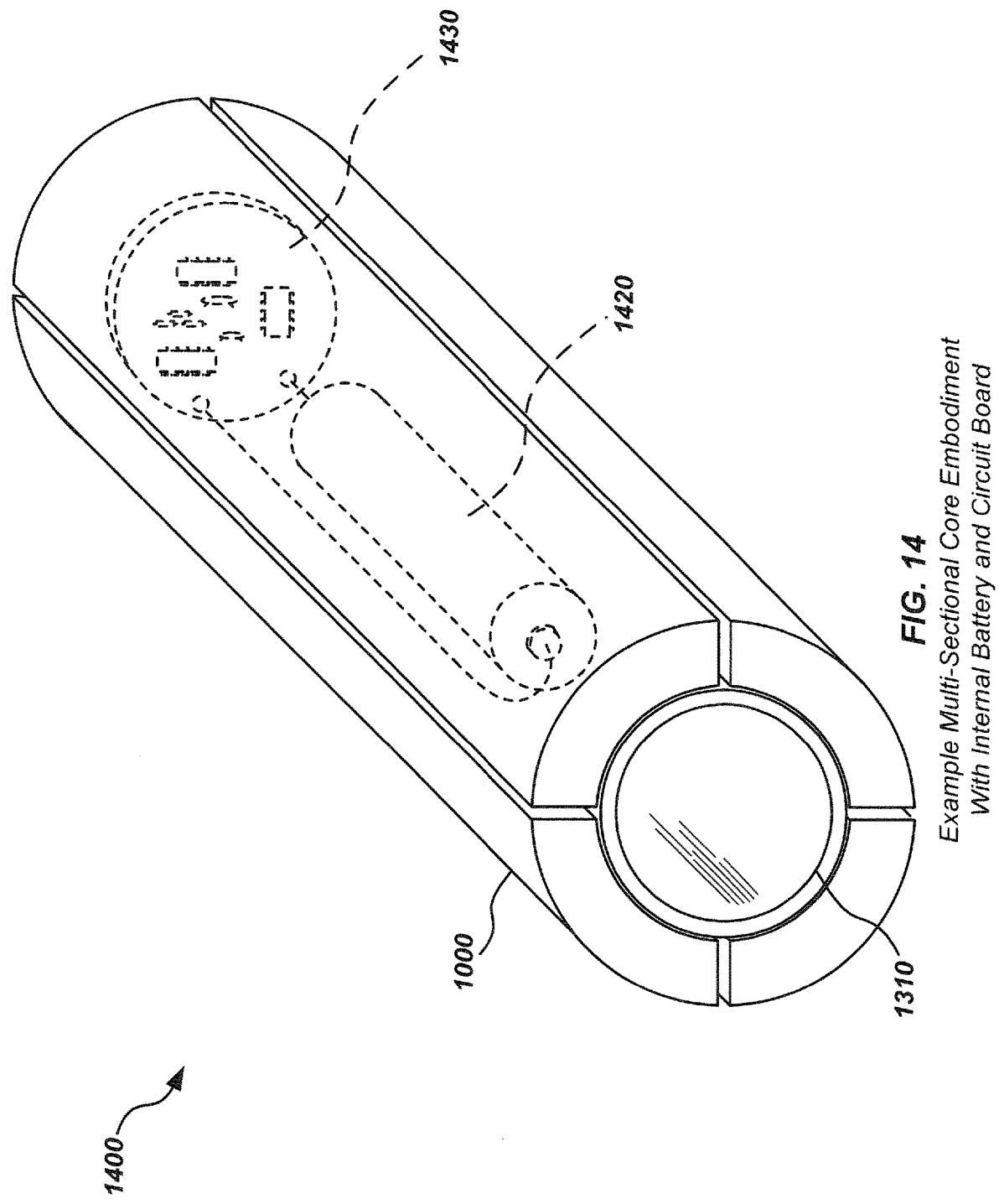
FIG. 14 illustrates details of an embodiment of a sonde device with power and circuitry enclosed within a core including four ferrite arc core section elements.

FIG. 13 illustrates details of an embodiment 1300 of a sonde core structure including four arc core section elements forming a ferrite core 1000 and a non-conductive inner tubular structural support 1310, which may be made of non-conductive plastics, fiberglass, or other materials. Additional sonde device elements may be disposed within support 1310. For example, as shown in FIG. 14, a battery 1420 and one or more printed circuit boards 1430 or other circuit elements or modules may be disposed within support 1310 in the center of the sonde core. Sonde device operation may be enhanced by positioning the power supply (e.g., battery 1420) and associated electronics (e.g. circuit board module 1430) partially or fully within the ferrite core 1000.

Figure 15:
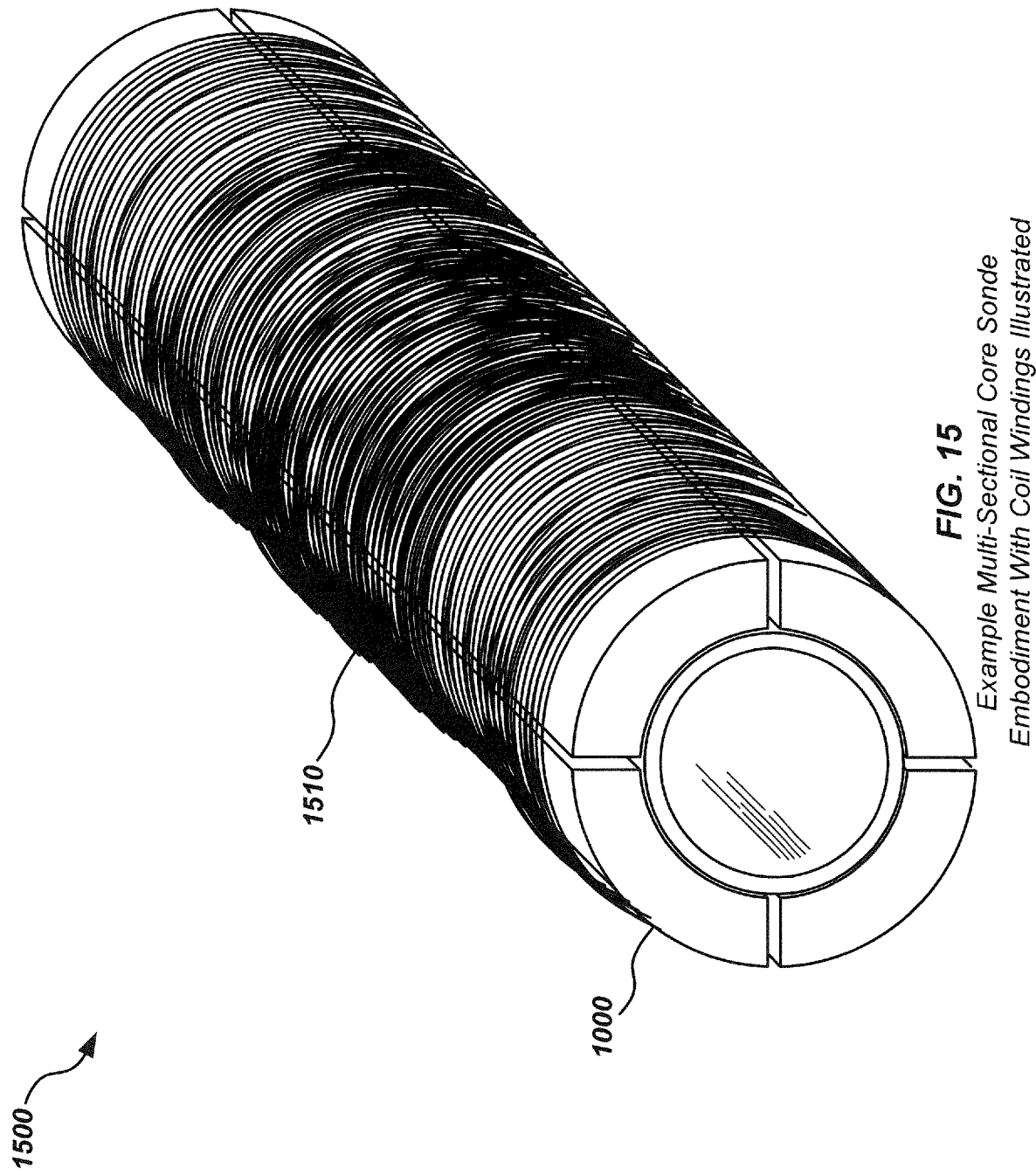
FIG. 15 illustrates details of an embodiment of a sonde device and coil windings.

FIG. 15 illustrates an example sonde device embodiment 1500, which may comprise embodiment 1400 or other core structures along with one or more coil windings 1510, which may be disposed around arc core section elements or outside an additional structural element (not shown) positioned on the outside of the arc section core elements (e.g., another fiberglass cylindrical structure similar to support structure 1310 but positioned outside of the ferrite arc core sections).

Figure 16A:
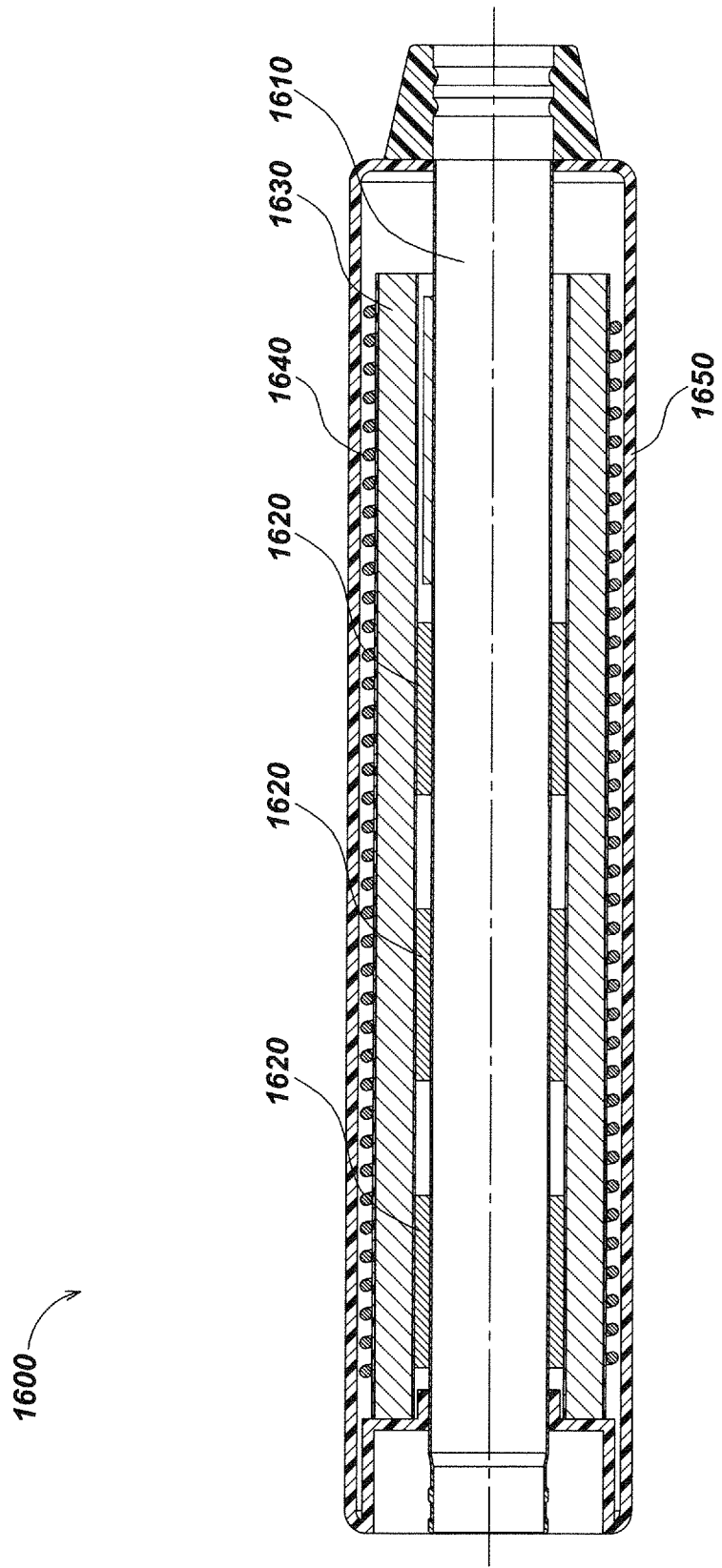
FIG. 16A is an illustration of a sonde embodiment allowing a central passage.
Figure 16B:
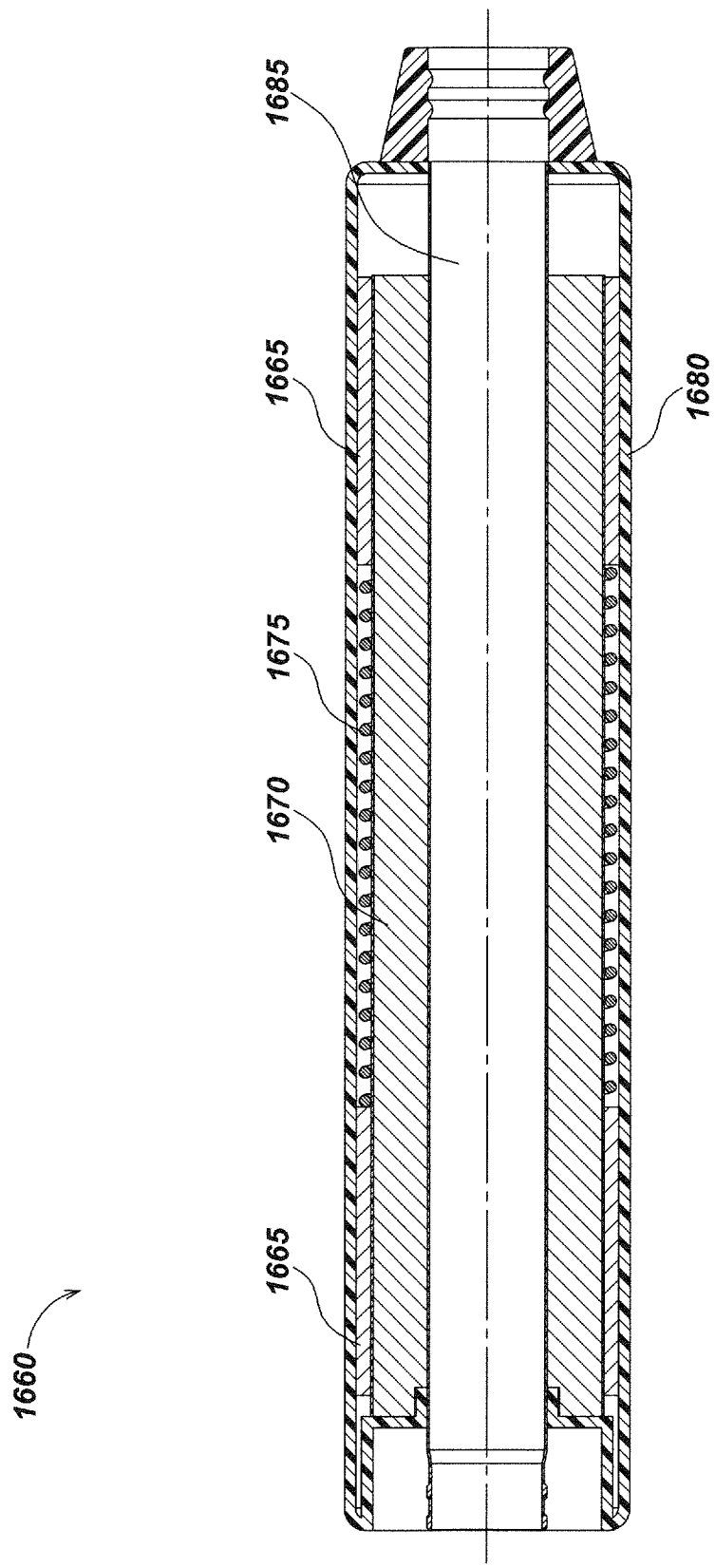
FIG. 16B is an illustration of an alternative sonde embodiment allowing a central passage.
Figure 16C:
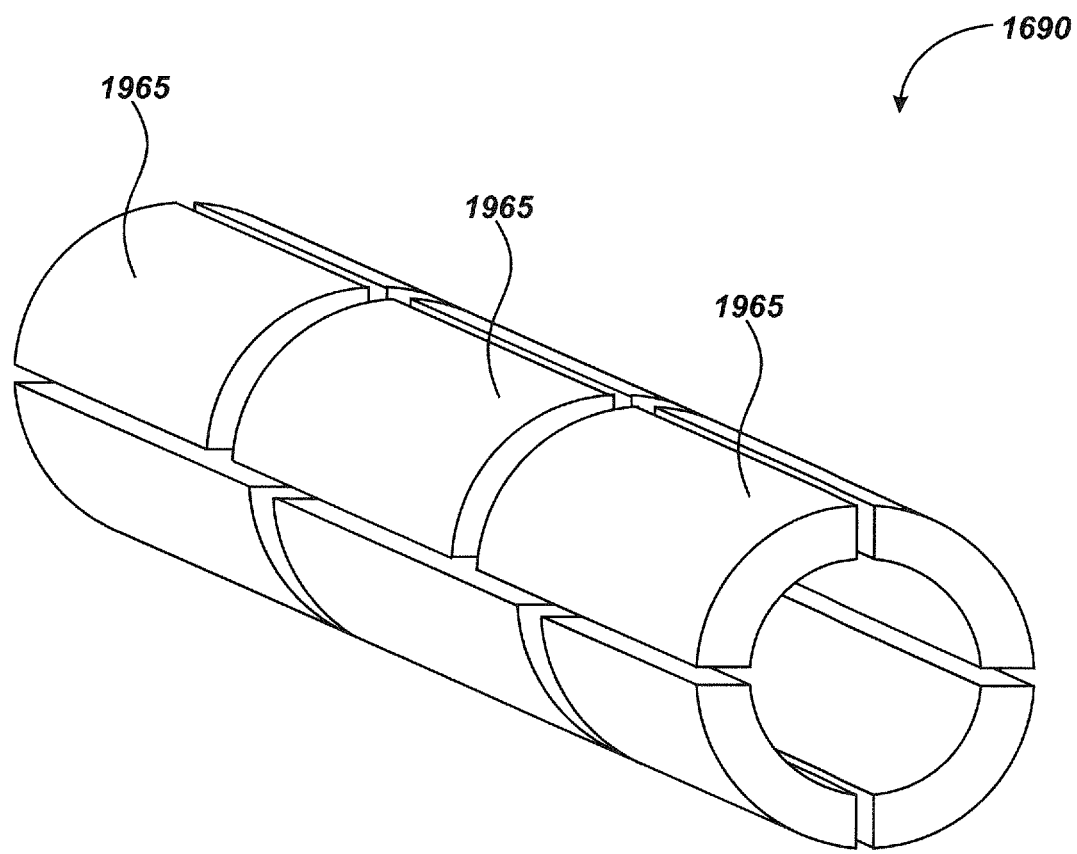
FIG. 16C is an illustration of one embodiment of a core structure configuration.
Figure 17:
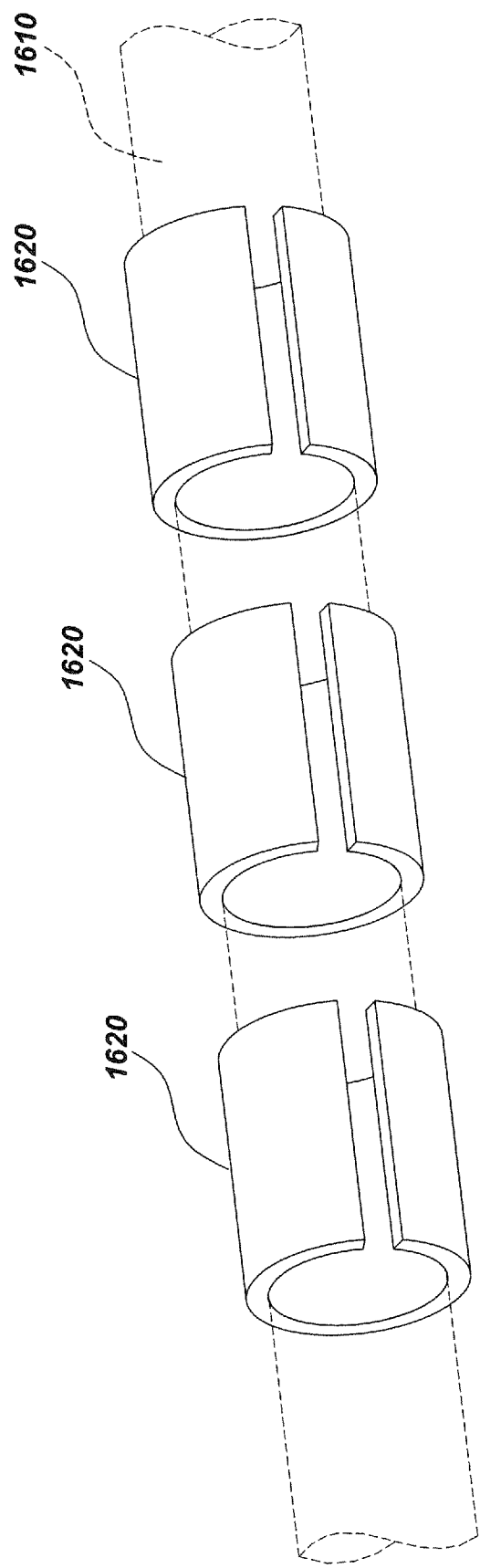
FIG. 17 is an illustration of an embodiment of curved batteries from FIG. 16A.

Turning to FIGS. 16A-17, an embodiment 1600 of a sonde device may allow for a central passage 1610 allowing the sonde device 1600 to secure about cabling, hose, or the like. Such an embodiment may be powered by batteries, such as Lithium Polymer batteries 1620 best illustrated in FIG. 17. The batteries, such as the Lithium Polymer batteries 1620, may be wrapped into curved sections allowing them to be secured circumferentially about the central passage 1610. Core sections 1630 in keeping with the present disclosure may be secured about the batteries 1620, enclosing both the batteries 1620, the central passage 1610, as well as other internal electronics and components not illustrated. Coil windings 1640 may in turn may be secured about the core sections 1630. A sonde housing 1640 may further encapsulate the aforementioned components. In some embodiments, the battery or batteries may be located away from the coil windings and/or not encapsulated by the core sections. For instance, the embodiment 1660 of FIG. 16B may have batteries 1665 located on the wrapped ends of the sonde device 1660 secured outside of the core sections 1670. Coil winding 1675 may wrap centrally about the core sections 1670 between the batteries 1665. A sonde housing 1680 may further encapsulate the internal components such to allow a central passage 1685 to be formed.

In some embodiments, one or more core sections may be used along the length of a sonde device in keeping with the present disclosure. As illustrated in FIG. 16C, a lengthwise sectioned core embodiment 1690 may utilize multiple core sections lengthwise, such as the three core sections 1695. In such embodiments, the circumferential breaks between core sections may be staggered with the circumferential breaks between core sections of other rows of core sections.

Figure 18:
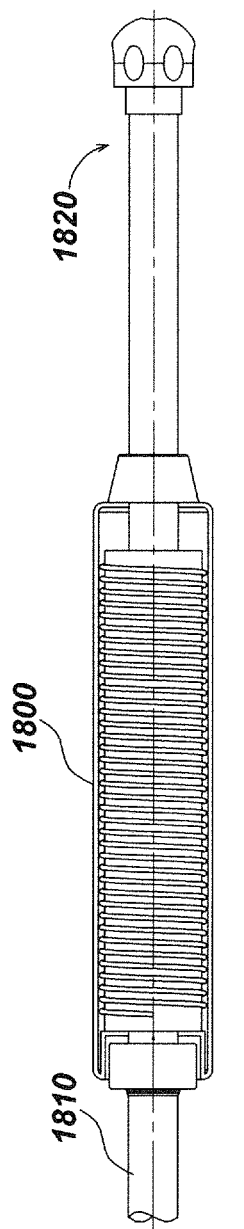
FIG. 18 is an illustration of a sonde embodiment similar to the embodiments of FIG. 16A or 16B on a on a sewer or push jetter.
Figure 19:
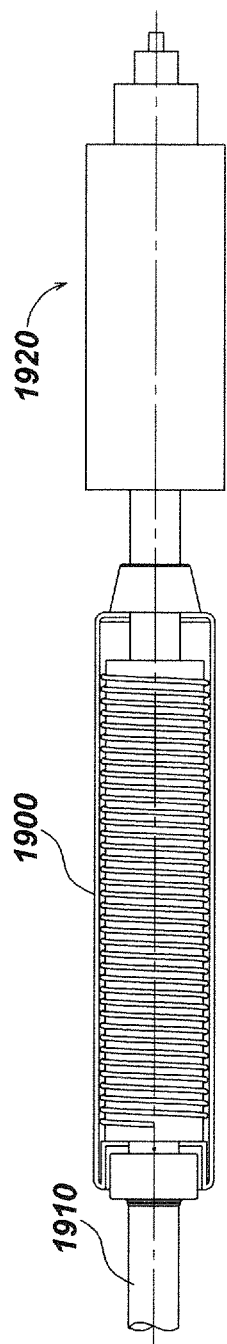
FIG. 19 is an illustration of a sonde embodiment similar to the embodiments of FIG. 16A or 16B on a horizontal directional drilling system.

The central passage 1610 may allow for the sonde device 1600 to be ideally used in, for instance, horizontal directional drilling, other boring tools, push jetters, and other scenarios where a passage is needed for fluids, material, drilling or cutting tools, slurries, and/or cabling to pass through. As illustrated in FIG. 18, a sonde device 1800 similar in design to the sonde device 1600 of FIG. 16A or the sonde device 1660 of FIG. 16B may be secured to hose 1810 of a sewer jetter or push jetter 1820. Details and information regarding sewer or push jetters may be found in U.S. patent application Ser. No. 13/073,919, entitled PIPE INSPECTION SYSTEM WITH JETTER PUSH-CABLE, filed Mar. 28, 2011, the content of which is incorporated by reference herein. As illustrated in FIG. 19, a sonde device 1900 similar in design to the sonde device 1600 as illustrated in FIG. 16A or sonde device 1660 of FIG. 16B may be secured to drill string 1910 of a horizontal directional drilling system 1920. In yet other embodiments, a sonde similar to the sonde device 1600 may be built directly into certain devices. For instance, a sonde device may be built onto or installed into a drill string section.

Figure 20:
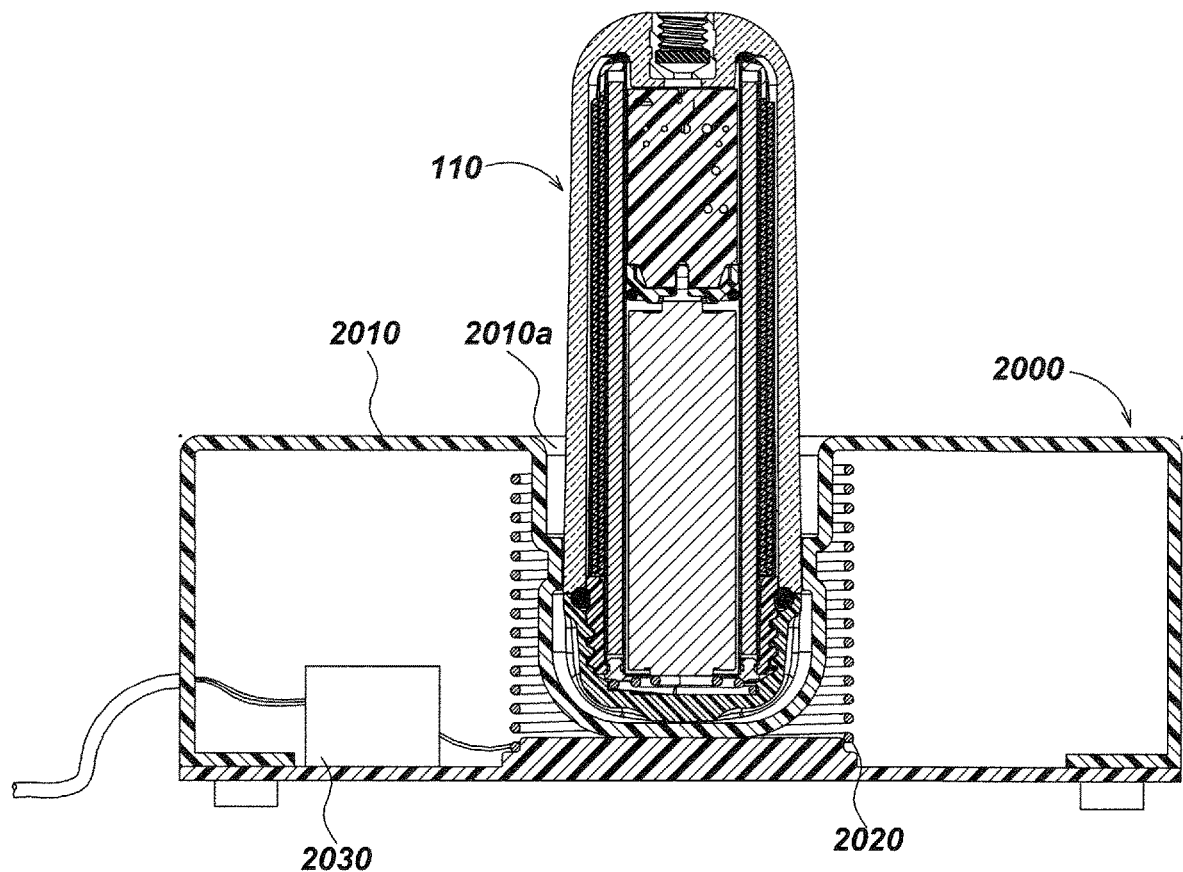
FIG. 20 is an illustration of an embodiment of a sonde in an inductive charger.

Turning to FIG. 20, some embodiments may be configured to be inductively charged. For instance, the sonde device embodiment 110, when coupled with an appropriate battery, may be charged by inductive charger mechanism 2000. The sonde device 110 may be placed within an appropriately dimensioned cavity 2010a in the inductive charger housing 2010. Internally, inductive charge coils 2020 may surround cavity 2010a. The inductive charge coils 2020 may further be wired to an enabled charge circuitry 2030 which in turn may be coupled to an appropriate power source.

Figure 21:
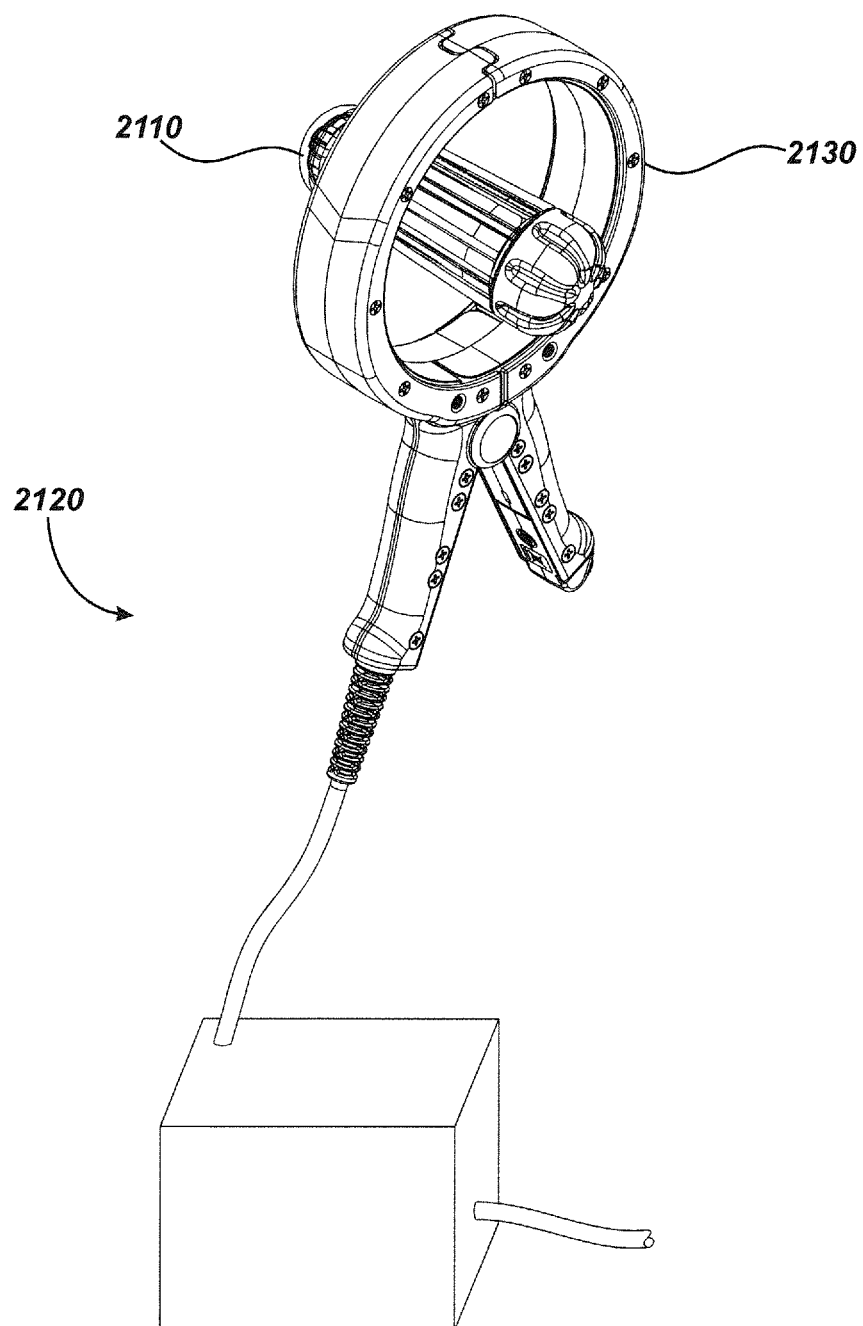
FIG. 21 is an illustration of an alternative embodiment of inductively recharging sonde batteries.

Turning to FIG. 21, in some embodiments of a sonde device in keeping with the present disclosure, such as the sonde 2110, an inductive charger such as the inductive charger 2120 may utilize a clamp 2130 to surround and charge the sonde 2110. An inductive charger such as the inductive charge 2120 may be ideal for inductively recharging sonde embodiments that may be built onto a cable, hose, drill string, or other system which may otherwise be cumbersome to disconnect the sonde.

Figure 22:
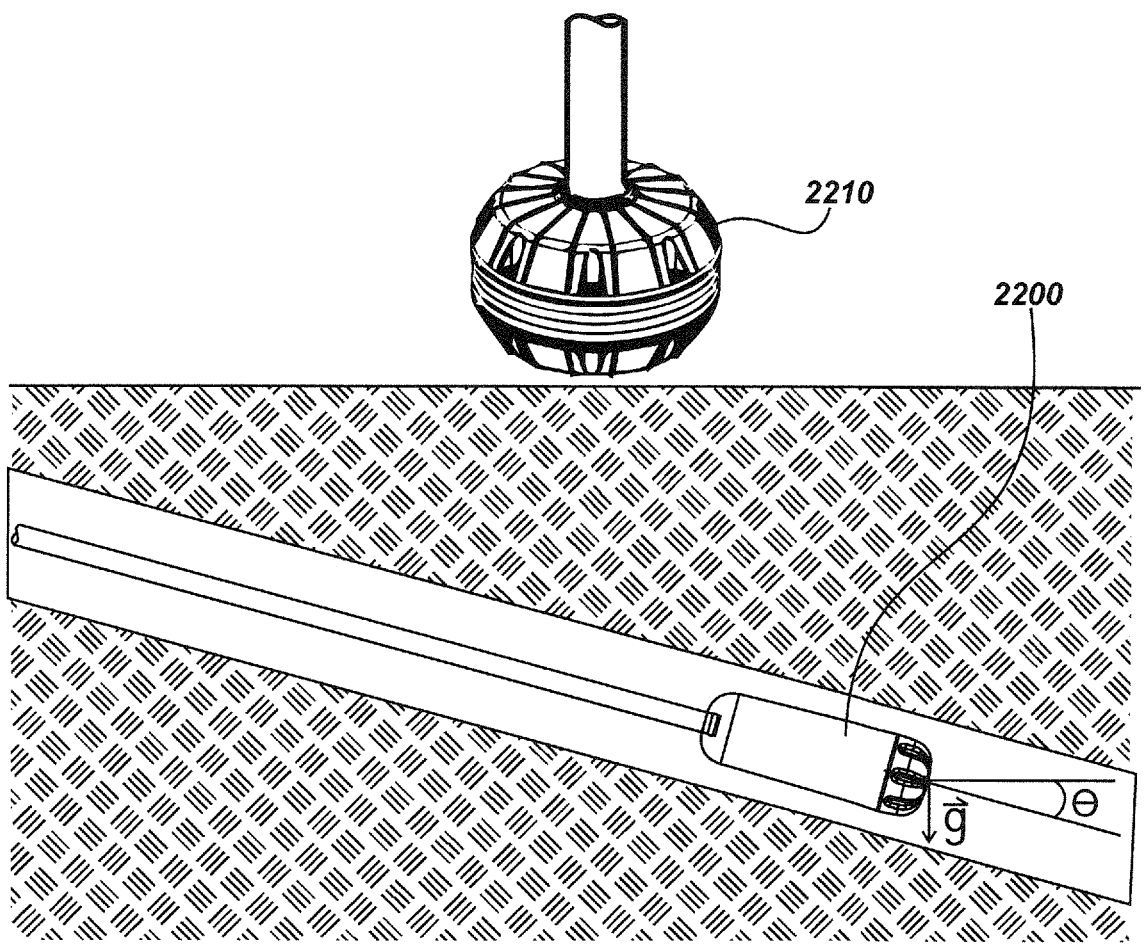
FIG. 22 is an illustration demonstrating an embodiment of data broadcast from a sonde.
Figure 23:
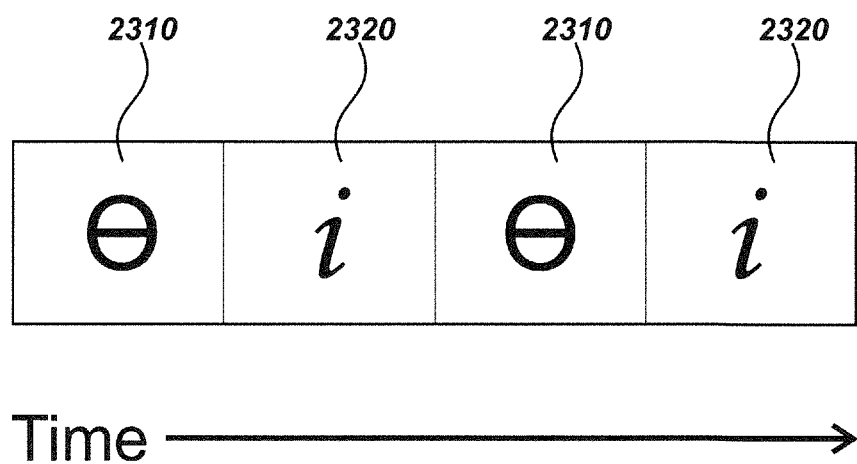
FIG. 23 is an illustration demonstrating an embodiment of data broadcast from a sonde.

As illustrated in FIG. 22, the angle Θ from the horizontal with respect to gravity $\vec{g}$ may be determined through, for instance an accelerometer in an enabled sonde device such as sonde 2200. The deviation from the horizontal or vertical axis with respect to the sondes axis may be used and transmitted to an enabled locator device 2210 partially obscured from view in FIG. 22.

In some embodiments, a sonde device in keeping with the present disclosure may be configured to transmit data via a transmitter or transceiver module. This data may include, but is not limited to, the measurement of the angle Θ 2310 as defined in FIG. 22 as well as the sonde signal strength or current power level i 2340 over time. The data broadcasted from the sonde, the measured angle Θ 2310 for instance, may be received and displayed by a locator device. By knowing the current power level i 2340 of a sonde device, an enabled locator may eliminate one unknown thus making it easier for solving for other unknown parameters, such as buried object location or depth. For example, knowledge of transmitted power may be used in a locator signal processing circuit, in conjunction with received signal strength, angular information, phase information, and the like from one or more antennas to refine estimates of location and depth of a buried object such as a pipe or conduit, or other cavity in which the sonde is positioned. An enabled locator may further utilize broadcasted current power level i 2340 to determine signal strength loss due to pipe material and thereby determine pipe material. Binary phase shift keying or other encoding schemes may be used in transmitting this data.

Alternative embodiments of a sonde device in keeping with the present disclosure may be enabled to regulate constant power to a sonde with a known current. The signal output by the sonde may be measured and such measurements may be used to further control the output. Pulse-width modulation or other similar technique may be utilized to regulate the power. In such an embodiment, an enabled locator may more easily locate the sonde device. A locator device may further be enabled to communicate with such a sonde device. In some such embodiments, an initial calibration may be performed whereby the enabled locator device may measure the sonde strength in a known distance and orientation from the locator.

In yet other embodiments, a sonde device in keeping with the present disclosure may be enabled to measure its own field strength and communicate this data to an enabled locator device. In such embodiments, the locator device may be enabled to recognize and compensate for degradation of the magnetic field of the sonde device as its battery discharges. This may allow for such an enabled locator device to more easily determine the position of the sonde device.

In some embodiments, temperature compensated crystal oscillators (referred to hereafter as TCXO) or voltage controlled temperature compensated crystal oscillator (VCTCXO) may be used to provide a precise and stable time reference on the sonde to allow the phase to be tracked and/or allow synchronous detection techniques to be used.

In some configurations, the various systems and modules include means for performing various functions as described herein. In one aspect, the aforementioned means may be a processor or processors and associated memory in which embodiments reside, and which are configured to perform the functions recited by the aforementioned means. The aforementioned means may be, for example, processors, logic devices, memory, and/or other elements residing in a sonde or coupled element, such as a camera head, camera control module, display module, and/or other modules or components. In another aspect, the aforementioned means may be a module or apparatus configured to perform the functions recited by the aforementioned means.

In one or more exemplary embodiments, the functions, methods and processes described herein in conjunction with sondes and sonde operations may be implemented in hardware, software, firmware, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. Any accompanying method claims may present elements of the various steps in a sample order, but are not meant to be limited to the specific order or hierarchy presented unless explicitly noted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, functions, and circuits described in connection with the embodiments disclosed herein may be implemented or performed in a processing element with a general purpose processor, special purpose processor, digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine, which may be programmed to perform the specific functionality described herein, either directly or in conjunction with an external memory or memories. A processor may also be implemented as a combination of computing devices, e.g., a combination of a DSP and a microprocessor, a plurality of microprocessors, one or more microprocessors in conjunction with a DSP core, or any other such configuration.

As used herein, computer program products comprising computer-readable media including all forms of computer-readable medium except, to the extent that such media is deemed to be non-statutory, transitory propagating signals.

The scope of the invention is not intended to be limited to the aspects shown herein, but is to be accorded the full scope consistent with the language and drawings herein, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the invention. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the appended claims and their equivalents.

We claim:

1. A sonde device, comprising:
   an elongate cylindrical waterproof housing;
   a magnetic core centrally and axially disposed inside the housing, the magnetic core including:
   a plurality of core section elements, each core section element in direct physical contact with one or more other of the core section elements;
   an electronic circuit disposed within the housing, the electronic circuit configured to generate an alternating current signal output at one or more different predetermined frequencies; and
   a coil assembly disposed along the length of the magnetic core, the coil assembly comprising a winding wound outside the plurality of core section elements, the winding being coupled to the output of the electronic circuit to receive the alternating current signal and generate a corresponding magnetic field dipole signal.

2. The sonde device of claim 1, wherein the core section elements comprise ferrite.

3. The sonde device of claim 1, wherein the core section elements comprise steel.

4. The sonde device of claim 1, wherein the output signal is switched between two or more of the predetermined frequencies.

5. The sonde device of claim 1, further including a support structure for positioning the core section elements thereon.

6. The sonde device of claim 1, wherein the plurality of core section elements are arranged in two or more rows.

7. The sonde device of claim 1, wherein the one or more different predetermined frequencies are selected by a user.

8. The sonde device of claim 1, wherein the one or more different predetermined frequencies are automatically selected.

9. The sonde device of claim 1, further comprising a battery to power the electronic circuit.

10. The sonde device of claim 1, further including an LED device disposed on or within the housing providing light output visible from outside of the housing.

11. The sonde device of claim 10, wherein the LED device provides a colored light output corresponding to the one or more different predetermined frequencies.

12. The sonde device of claim 10, wherein the LED device provides a light output corresponding to information associated with the sonde.

13. The sonde device of claim 12, wherein the information comprises battery information.

14. The sonde device of claim 1, further comprising an electrical connection to receive electrical power from an operatively coupled power source.

15. The sonde device of claim 1, wherein a central passage is formed within the sonde.

16. The sonde device of claim 15, wherein the central passage is configured to pass fluids therethrough.

17. The sonde device of claim 15, wherein the central passage is configured to pass a cutting tool therethrough.

18. The sonde device of claim 15, wherein the central passage is configured to pass wiring therethrough.

19. The sonde device of claim 9, further including an inductive charging circuit to charge the battery.

* * * * *